(12) United States Patent
Hammond

(10) Patent No.: US 11,539,708 B1
(45) Date of Patent: Dec. 27, 2022

(54) CONTENT SOURCE VERIFICATION AND AUTHENTICATION USING LINKED ACCOUNTS

(71) Applicant: Che Hammond, Morgan Hill, CA (US)

(72) Inventor: Che Hammond, Morgan Hill, CA (US)

(*) Notice: Subject to any disclaimer, the term of this patent is extended or adjusted under 35 U.S.C. 154(b) by 16 days.

(21) Appl. No.: 17/249,962

(22) Filed: Mar. 19, 2021

Related U.S. Application Data

(60) Provisional application No. 62/993,879, filed on Mar. 24, 2020.

(51) Int. Cl.
| | |
|---|---|
| *H04L 9/40* | (2022.01) |
| *G07C 13/00* | (2006.01) |
| *H04L 67/104* | (2022.01) |
| *H04L 51/52* | (2022.01) |
| *H04L 51/212* | (2022.01) |

(52) U.S. Cl.
CPC .......... *H04L 63/104* (2013.01); *G07C 13/00* (2013.01); *H04L 51/212* (2022.05); *H04L 51/52* (2022.05); *H04L 67/1044* (2013.01)

(58) Field of Classification Search
CPC ..... H04L 63/104; H04L 51/52; H04L 51/212; H04L 51/58; H04L 67/1044; G07C 13/00
See application file for complete search history.

(56) References Cited

U.S. PATENT DOCUMENTS

| | | | | |
|---|---|---|---|---|
| 8,769,097 | B2 * | 7/2014 | Rizk | G06Q 50/01 |
| | | | | 235/386 |
| 10,104,034 | B1 * | 10/2018 | Coullon | H04L 51/58 |
| 2010/0261488 | A1 * | 10/2010 | Little | H04W 4/02 |
| | | | | 455/466 |
| 2015/0095154 | A1 * | 4/2015 | Kannan | G06Q 50/01 |
| | | | | 705/14.55 |
| 2015/0281384 | A1 * | 10/2015 | Gunnarsson | G06Q 10/109 |
| | | | | 709/204 |
| 2015/0370798 | A1 * | 12/2015 | Ju | H04L 12/185 |
| | | | | 707/748 |
| 2017/0344610 | A1 * | 11/2017 | Evnine | G06F 16/9535 |
| 2018/0130138 | A1 * | 5/2018 | Kumar | H04L 51/52 |
| 2019/0012747 | A1 * | 1/2019 | Antonelli | G06Q 30/0282 |
| 2020/0106630 | A1 * | 4/2020 | Bourassa | H04L 12/1818 |
| 2020/0213087 | A1 * | 7/2020 | Mazzarella | H04L 9/0643 |

* cited by examiner

*Primary Examiner* — Jungwon Chang
(74) *Attorney, Agent, or Firm* — Schwegman Lundberg & Woessner, P.A.

(57) ABSTRACT

Disclosed are systems, methods, and non-transitory computer-readable media for content source verification and authentication using linked accounts. An authenticated group management system provides an improved approval process to create authenticated groups of linked accounts. In contrast to current systems in which a single gatekeeper reviews requests to add users to a group, the approval process utilized by the authenticated group management system enables each member of the authenticated group to review and respond to each request to add a prospective user. The more stringent approval process implemented by the authenticated group management system provides for a higher degree of authentication that each member of the authenticated group can be trusted, thereby increasing the security of content shared by the members of the authenticated group.

20 Claims, 21 Drawing Sheets

CONTENT SOURCE VERIFICATION AND AUTHENTICATION USING LINKED ACCOUNTS

CROSS-REFERENCE TO RELATED APPLICATIONS

The present application claims the benefit of priority of U.S. Provisional Application No. 62/993,879, filed on Mar. 24, 2020, which is incorporated herein by reference in its entirety.

TECHNICAL FIELD

An embodiment of the present subject matter relates generally to data security, more specifically, to content source verification and authentication using linked accounts.

BACKGROUND

Online services allow users to connect with each other for the purpose of networking and/or sharing content. For example, some online services allow users to create groups in which individuals who share similar backgrounds, ideas, interests, etc., form a type of community. These groups may be established as private, meaning that requests to join the group must be approved before the requesting member is admitted, however the approval process is generally controlled by a single account administrator. While these types of private groups do provide some level of authentication or approval before a new member is admitted, the level of protection is often inadequate as a single gatekeeper maintains control of the approval process. As a result, members of the group may not feel secure sharing content with the other members and/or trust content received from other members. For example, nefarious members of the group may use shared information in an undesired manner and/or share content that is embedded with spyware or poses other data security risks. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
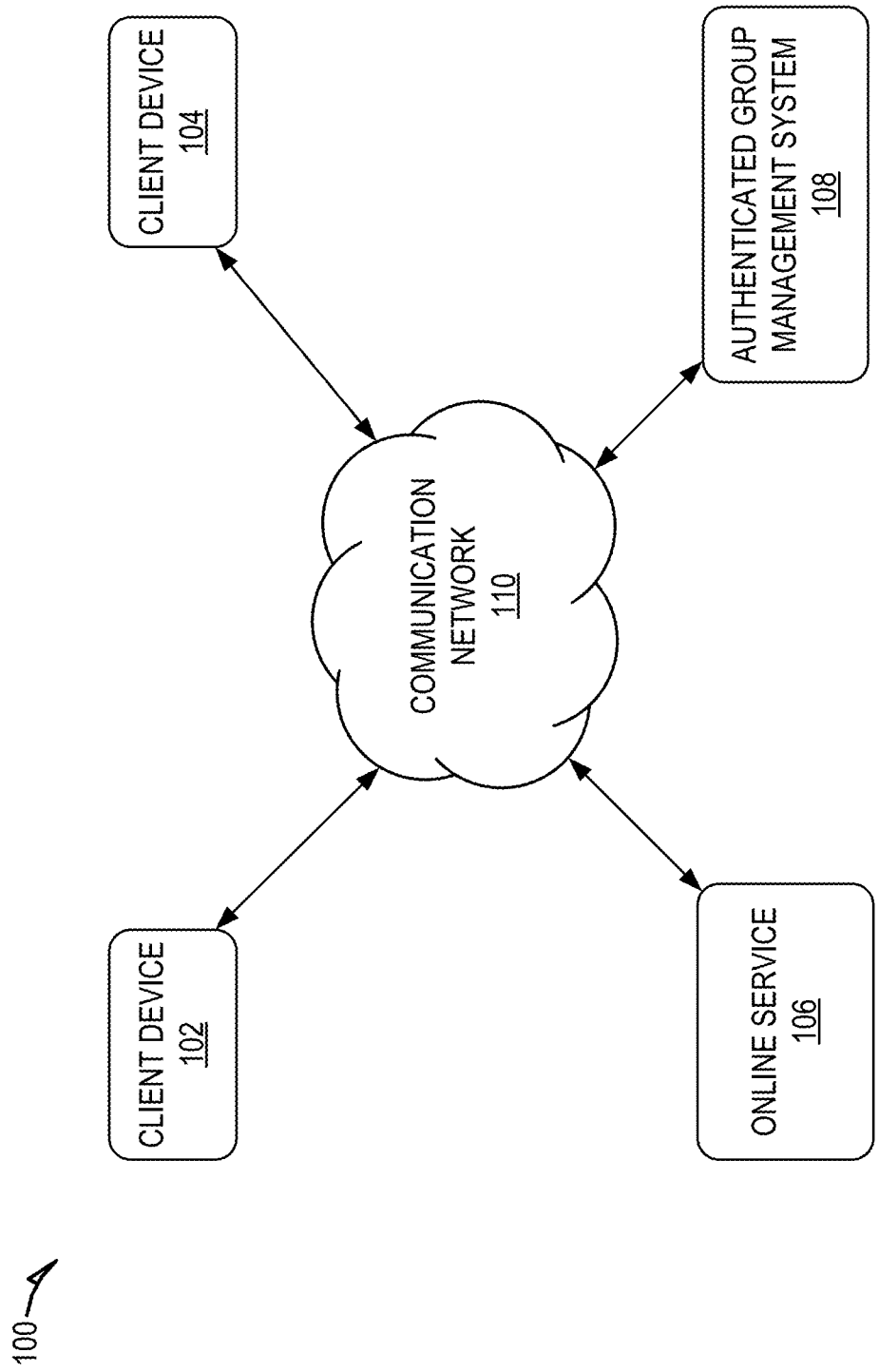
FIG. 1 shows a system for content source verification and authentication using linked accounts, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for content source verification and authentication using linked accounts. An online service, such as a social networking service (e.g. Facebook), may allow a user to create authenticated groups of linked accounts to form a community with other users. For example, a user may create an authenticated group related to a specific activity or interest, such as outdoor activities, knitting, guitar, and the like. To form an authenticated group on the online service, user accounts associated with the members of the authenticated group are linked together. Linking the user accounts enables each member of the authenticated group to use their user account to access content posted by the other members of the authenticated group, as well as share content with the other members of the authenticated group. Examples of content includes comments, posts, articles, videos, and the like.

The online service allows users to designate an authenticated group as being either public or private. In a public group, the content shared among the group members is accessible not only by the members of the authenticated group, but also by other users of the online service that are not members of the authenticated group. In contrast, content shared in a private group may be accessed by members of the authenticated group, however users that are not members of the authenticated group may not be able to access the content.

In either case, an online service may implement an approval process as a condition to adding prospective users to an authenticated group. For example, the approval process may require that a request to add a prospective user to the authenticated group be approved before the user account of the prospective user is linked to the other user accounts in the authenticated group. The approval process ensures that each new member of the authenticated group is authenticated prior to being added to the authenticated group and therefore can be trusted by the other members of the authenticated group. This may alleviate concerns regarding sharing content with other members of the authenticated group as well as accessing content shared by the other members of the authenticated group.

Current systems provide a limited approval process in which a group administrator is often the singular gatekeeper in deciding whether to approve or deny requests to join a group. This presents a potential security risk as the quality of the approval process is directly related to the performance of the group administrator. For example, a group administrator that does not properly vet or authenticate each user requesting to join the group may enable nefarious users to easily join the group. As a result, members of the group may not feel secure sharing content with the other members of the group and/or trust content shared by the other members. Accordingly, a technical problem exists regarding how to properly authenticate the members of a group to provide content security and protect the privacy of the members of the group.

To alleviate these issues, an authenticated group management system facilitates an improved approval process for creating authenticated groups. In contrast to current systems in which the approval process is limited to a single gatekeeper, the approval process utilized by the authenticated group management system enables each member of the authenticated group to review and respond to requests to add a prospective user to the authenticated group. For example, the authentication group management system may provide the members of the authenticated group with a user interface that presents data describing the prospective user, as well as enables each member to provide a response either approving or denying the request.

The authenticated group management system uses the responses of the members of the authenticated group to determine whether to approve or deny the request. For example, the authenticated group management system may calculate an approval score based on the responses and then compare the approval score to a threshold approval score. If the approval score meets or exceeds the threshold approval score, the authenticated group management system approves the request. In contrast, the authenticated group management system denies the request if the approval score is less than the threshold approval score.

The authenticated group management system may determine the approval score based on a variety of factors. For example, the authenticated group management system may determine the approval score based on the number of responses to approve the request, the number of responses to deny the request, the percentage of members that selected to approve the request, and the like. The authenticated group management system may apply weights to the response based on profile data associated with the members of the authenticated group. For example, the authenticated group management system may apply weights based on how long each member has been a member of the group, a level at which each member participates in the group, and the like.

In some embodiments, requesting to initiate the approval process may be limited to existing members of the authenticated group. For example, the authenticated group management system allows only members of the authenticated group to initiate a request to add a prospective user. Accordingly, users that are not members of the group may not initiate a request. In this type of embodiment, an invite to join the group is provided to a prospective user after completion of the approval process, assuming that the request has been approved.

In some embodiment, the authenticated group management system may limit the number of concurrent approval processes that may be initiated for an authenticated group. For example, the authenticated group management system may limit the authenticated group to one or two concurrent approval processes. In this type of embodiment, the authenticated group management system may disable the ability of the members of the authenticated group to submit requests while the number of concurrent approval processes meets a specified maximum number of concurrent approval processes.

The approval process facilitated by the authenticated group management system ensures that each request to join the authenticated group is properly vetted by allowing multiple members of the authenticated group to review the request and provide input in the decision making process. This more stringent approval process provides improved authentication that member of the authenticated group are not nefarious users, thereby increasing trust among the members that sharing content with the authenticated group is secure and safe.

FIG. 1 shows a system for content source verification and authentication using linked accounts, according to some example embodiments. As shown, multiple devices (i.e., client device 102, client device 104, online service 106, and authenticated group management system 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1400 shown in FIG. 14.

To facilitate communication with other computing devices, a computing device includes a communication interface configured to receive a communication, such as a request, data, and the like, from another computing device in network communication with the computing device and pass the communication along to an appropriate module/component running on the computing device. The communication interface also sends a communication to another computing device in network communication with the computing device.

In the system 100, users interact with the online service 106 to utilize the services provided by the online service 106. Users communicate with and utilize the functionality of the online service 106 by using the client devices 102 and 104 that are connected to the communication network 110 by direct and/or indirect communication.

Although the shown system 100 includes only two client devices 102, 104, this is only for ease of explanation and is not meant to be limiting. One skilled in the art would appreciate that the system 100 can include any number of client devices 102, 104. Further, the online service 106 may concurrently accept connections from and interact with any number of client devices 102, 104. The online service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online service 106 via a client-side application installed on the client devices 102 and 104. In some embodiments, the client-side application includes a component specific to the online service 106. For example, the component may be a stand-alone application, one or more application plug-ins, and/or a browser extension. However, the users may also interact with the online service 106 via a third-party application, such as a web browser, that resides on the client devices 102 and 104 and is configured to communicate with the online service 106. In either case, the client-side application presents a user interface (UI) for the user to interact with the online service 106. For example, the user interacts with the online service 106 via a client-side application integrated with the file system or via a webpage displayed using a web browser application.

The online service 106 is one or more computing devices configured to provide a cloud-based service that enables various users to share content. For example, the online service 106 may provide a social media service that allows users to create accounts, establish connections with other accounts, share content, access content shared by other members, and the like. The online service 106 also enables users to create authenticated groups of linked accounts. An authenticated group of linked accounts allows the members of the authenticated group to interact in a communal environment, such as by sharing content with each other, viewing content posted by the other members, and the like.

As explained earlier, the authenticated group of linked accounts can be established as a private group such that the interactions between the members and the shared content can only be accessed by the members of the authenticated group. This allows the group members to interact in a secure and private environment. For example, group members can share information and content knowing that it can only be accessed by the other trusted members of the authenticated group.

To provide authentication that the members of the authenticated group can be trusted (e.g., are not nefarious actors), the online service 106 utilizes the functionality of the authenticated group management system 108. The authenticated group management system 108 is one or more computing devices configured to facilitate an improved approval process for handling requests to join an authenticated group. Although the authenticated account group system 108 is shown separately from the online service 106, this is for ease of explanation and is not meant to be limiting. In some embodiments, the functionality of the authenticated group management system 108 is partially or completely integrated within the online service 106

In contrast to the approval process utilized by current system, the approval process utilized by the authenticated group management system 108 enables each member of an authenticated group to review and respond to requests to add a new user to an authenticated group. For example, the authentication group management system 108 provides the members of the authenticated group with a user interface that presents data describing the new user, as well as enables each member to provide a response selecting to either approve or deny the request to add the new user to the authenticated group.

The authenticated group management system 108 gathers the responses provided by the members of the authenticated group to determine whether to approve or deny the request. For example, the authenticated group management system 108 may calculate an approval score based on the responses and then compare the approval score to a threshold approval score. If the approval score meets or exceeds the threshold approval score, the authenticated group management system 108 approves the request. In contrast, if the approval score is less than the threshold approval score, the authenticated group management system 108 denies the request.

The authenticated group management system 108 may determine the approval score based on a variety of factors. For example, the authenticated group management system may determine the approval score based on the number of responses received from the members to approve the request, the number of responses to deny the request, the percentage of members that selected to approve the request, and the like. The authenticated group management system may apply weights to the response based on profile data associated with the members of the group. For example, the authenticated group management system may apply weights based on how long the member has been a member of the group, a level at which the member participates in the group, and the like.

In some embodiments, requests to join an authenticated group can only be initiated by an existing member of the authenticated group. Accordingly, users that are not members of the group may not initiate a request. In this type of embodiment, the authenticated group management system 108 provides an approved new member with an invite to join the authenticated group after completion of the approval process. However, if a request to add a new user is not approved, the authenticated group management system 108 does not provide the user with an invite.

In some embodiment, the authenticated group management system 108 may limit the number of concurrent approval processes that may be initiated for an authenticated group. For example, the authenticated group management system 108 may limit the group to one or two concurrent approval processes. In this type of embodiment, the authenticated group management system 108 may disable functionality that enables the members of the group to submit requests to add new users while the number of concurrent approval processes meets a specified maximum number of concurrent approval processes. The authenticated group management system 108 may enable the functionality again after the number concurrent approval processes falls back below the maximum number.

The approval process facilitated by the authenticated group management system 108 ensures that each request to join the group is properly reviewed, authenticated, and approved by the members. For example, the members of the group are provided with data describing the prospective new member, which they can review in detail, and decisions to approve or deny a request are based on responses provided by the group of members, rather than an individual gatekeeper. This more stringent approval process provides improved authentication that member of the authenticated group are not nefarious users, thereby increasing trust among the members of the authenticated group that content can be shared safely with the other members and that content shared by the other members is secure and safe for use.

Figure 2:
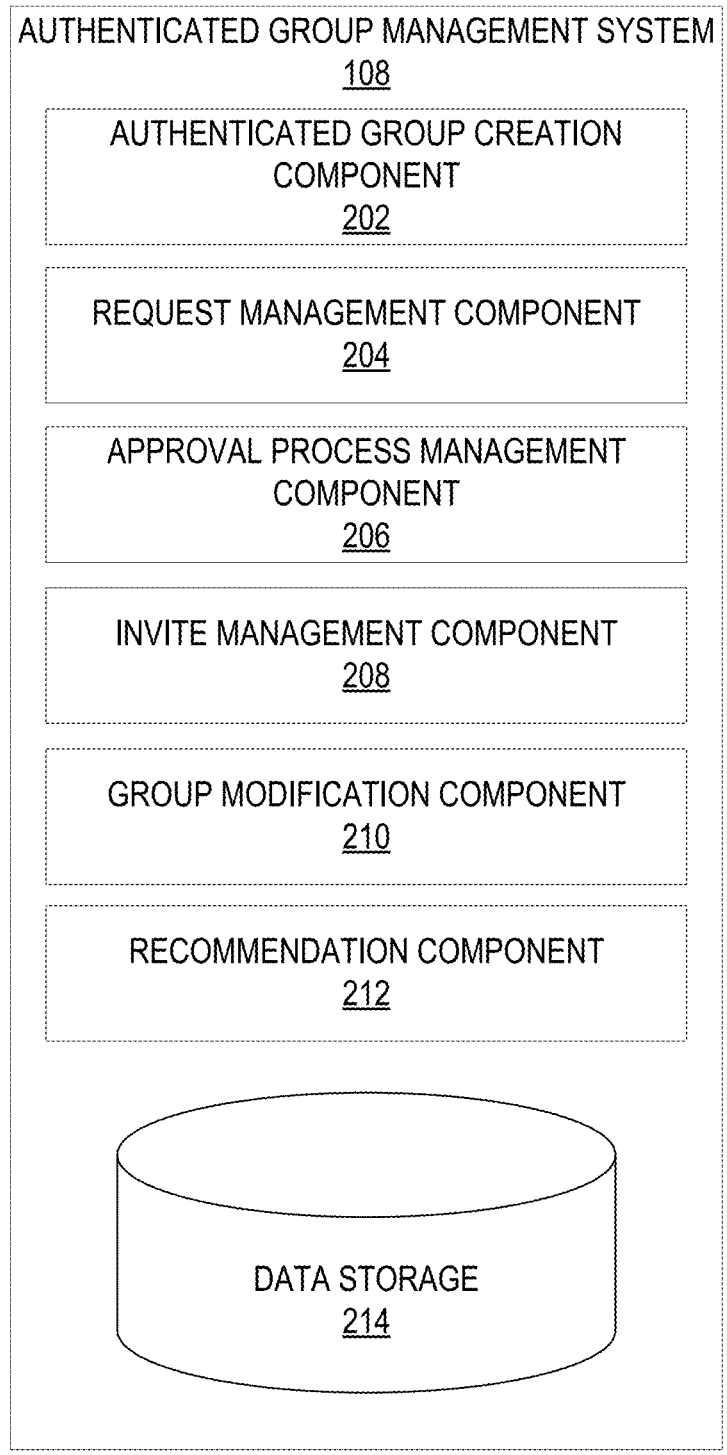
FIG. 2. is a block diagram of an authenticated group management system, according to some example embodiments.

FIG. 2 is a block diagram of an authenticated group management system 108, according to some example embodiments. To avoid obscuring the inventive subject matter with unnecessary detail, various functional components (e.g., modules, components) that are not germane to conveying an understanding of the inventive subject matter have been omitted from FIG. 2. However, a skilled artisan will readily recognize that various additional functional components may be supported by the authenticated group management system 108 to facilitate additional functionality that is not specifically described herein. Furthermore, the various functional modules/components depicted in FIG. 2 may reside on a single computing device or may be distributed across several computing devices in various arrangements such as those used in cloud-based architectures. For example, the various functional modules and components may be distributed amongst computing devices that facilitate both the authenticated group management system 108 and the online service 106.

As shown, the authenticated group management system 108 includes an authenticated group creation component 202, a request management component 204, an approval process management component 206, an invite management component 208, a group modification component 210, a recommendation component 212, and a data storage 214.

The authenticated group creation component 202 facilitates creation of an authenticated group. For example, the authenticated group creation component provides a group creation user interface that enables users of the online service 106 to initiate creation of a new authenticated group. For example, the group creation user interface prompts the user for specified data and includes user interface elements (e.g., buttons, text fields, etc.) that enable the user to enter data and select configurations associated with the new authenticated group. For example, the group creation user interface may prompt a user to provide data such as a name for the authenticated account group, description of the group, profile picture, background picture, other media the user would like to associate with the authenticated account group, and the like. The group creation user interface may also prompt user to select group configurations, such as designating the group as private or public, establishing a maximum number of members, selecting a maximum number of concurrent approval requests, defining approval thresholds, and the like.

The group creation component 202 uses the data provides by the user to create an authenticated group. For example, the group creation component 202 submits the data provided via the group creation user interface to systems responsible for provisioning the data structures associated with representing the authenticated group. The submission may take the form of creating a computer readable message, such a message in a format such as JSON, XML, Text, or Binary. The communication between the group creation user interface and provisioning system may be facilitated using a communication protocol, such as Websocket, HTTP, SMS, or UDP over Wi-Fi, Cellular Network, or hardwired connection.

Data associated with an authenticated group may be stored in the data storage 214. This may include any provided data describing the group, data identifying the linked user accounts associated with members of the authenticated group, content shared by the members of the authenticated group, and the like.

The request management component 204 provides functionality related to initiating requests to add prospective users to an authenticated group. A prospective user is a user of the online service 106 (e.g., a user with an associated account of the online service 106) that is not a member of the authenticated group.

The request management component 204 provides a request interface that enables a member of the authenticated group and/or other user of the online service 106 to initiate a request to add a prospective user to an authenticated group. For example, the request interface may include user interface elements (e.g., buttons, textboxes, etc.) that enable a member of the authenticated group and/or other user of the online service 106 to initiate a request, as well as provide data associated with the request, such as data identifying the prospective user, data identifying the user account of the prospective user (e.g., link to the prospective user's account), providing additional comments, and the like.

In some embodiments, the request management component 204 may allow any user of the online service 106 to initiate a request to add a prospective user to an authenticated group. Alternatively, the request management component 204 may limit the ability to initiate a request to existing members of the authenticated group. Limiting this ability to existing members of the authenticated group provides an additional level of authentication as the prospective user is known and/or has an existing relationship with at least one current member of the authenticated group.

In some embodiments, the request management component 204 may enforce restrictions related to eligibility of a prospective user. For example, an authorized group may be associated with one or rules of eligibility that limit the pool of prospective users that may be added to the authorized group. In one such embodiment, the rules of eligibility may be based on an existing link or connection of an account of a prospective user to the accounts of existing members of an authorized group. For example, the pool of prospective users may be limited to direct connections of existing members (e.g., friends), users within two degrees of connections of existing members (e.g., friends of friends), users that are connected to at least a threshold number of existing members (e.g., friends with at least 2 existing members), and the like.

As another example, the rules of eligibility may be based on profile data associated with the account of the prospective users. For example, the authorized group may be associated with a restriction that limits the pool of prospective users to users that attended a specified school, work in a certain industry, and the like. As another example, the authorized group may be associated with a restriction that limits the pool of prospective users to users that have met a specified threshold level of use in relation to the online service 106, such as by having shared a specified amount of content, logged in a threshold amount of times, and the like. In other example, the rules of eligibility may be based on a follower count of the prospective user, an age of the prospective user's account, whether the identity of a prospective user has verified, whether the prospective user is a paying subscribers of the online service 106, and/or any other specific criteria.

The request management component 204 may confirm that a prospective user satisfies the rules of eligibility (e.g., is eligible for consideration) prior to initiation of the approval process. For example, the request management component 204 may use data entered in a request, such as data identifying an account of the prospective user, to access information about the prospective user from the data storage 214. This may include user profile data, connection data, and the like. The request management component 204 uses the accessed information to determine whether the rules of eligibility have been satisfied.

If the request management component 204 determines that the rules of eligibility have not been satisfied (e.g., the prospective user is not eligible), the request management component 204 may cause a notification indicating that the request cannot be processed. Alternatively, if the request management component 204 determines that a prospective user is eligible (e.g., the rules of eligibility have been satisfied), the request management component 204 may communicate with the approval process management component 206 to initiate the approval process. For example, the request management component 204 may provide the approval process management component 206 with data included in the request, such as data identifying the prospective user, the account of the prospective user, data identifying the requesting member of the authenticated group, comments provided by the requesting member of the authenticated group, and the like.

The approval process management component 206 manages the approval process for adding prospective users to an authorized group. As explained earlier, the approval process used by current system is limited to a single gatekeeper. For example, a group administrator often is tasked with allowing or denying requests to join the group. In contrast, the approval process facilitated by the approval process management component 206 enables each member of an authenticated group to review and respond to requests to add a new user to an authenticated group, and determines whether to approve or deny a request based on a set of responses provided by the members of the authenticated group.

To accomplish this, the approval process management component 206 provides an approval interface that is accessible to the members of the authorized group. The approval interface presents the members of the authorized group with data associated with the approval process, such as data identifying the prospective user, profile data associated with the prospective user, a link to the prospective user's profile, comments provided by members of the authorized group, instructions for providing feedback, an amount of time remaining to respond to the request, and the like. The approval interface also enables the members of the authorized group to provide feedback in relation to the prospective user, such as by providing comments and asking questions, as well as provide a response to the request to add the prospective user to the authorized group. For example, each member may provide a response to either approve or deny the request to add the prospective user to the authorized group.

The approval process management component 206 gathers the responses provided by the members of the group to determine whether to approve or deny the request. For example, the approval process management component 206 may calculate an approval score based on the responses and then compare the approval score to a threshold approval score. If the approval score meets or exceeds the threshold approval score, the approval process management component 206 approves the request. In contrast, if the approval score is less than the threshold approval score, the approval process management component 206 denies the request.

The approval process management component 206 may determine the approval score based on a variety of factors. For example, approval process management component 206 may determine the approval score based on the number of responses to approve the request, the number of responses to deny the request, the percentage of members that selected to approve the request, and the like.

The approval process management component 206 may also apply weights to the responses when calculating the approval score. For example, the authenticated group management system may apply a weight to each response based on profile data associated with the member of the authenticated group that provided the response. Examples of the types of profile data than may be used to apply a weight include the date/time at which the member created an account with the online service 106, the date/time at which the member became a member of the authenticated group, a number of interactions (e.g., likes, comments, etc.) received in relation to content posted by the member, the amount of content posted by the member (e.g., number of posts, comments, etc.), and the like.

The approval process management component 206 determines whether to approve or deny a request based on a comparison of the approval score to a threshold approval score. For example, the approval process management component 206 denies the request if the approval score is less than the threshold approval score. Alternatively, the approval process management component 206 approves the request if the approval score, meets or exceed the threshold approval score.

The approval process management component 206 may notify a user that initiated the request if the request is denied. For example, the approval process management component 206 may transmit a message to the user indicating that the request to add the prospective user to the authorized group has been denied. Alternatively, if the request is approved, the approval process management component 206 may notify the user that the request has been approved. The approval process management component 206 may also communicate with the invite management component 208 to cause an invite to be submitted to the prospective user. For example, the approval process management component 206 may provide the invite management component 208 with data identifying the prospective user, contact data associated with the prospective user, and the like.

The invite management component 208 manages the process of inviting a prospective user to join an authenticated group. For example, the invite management component 208 generates an invite message for the prospective user that indicates that the prospective user is invited to join the authorized group. The invite message may include data describing the authorized group, a link to access the authorized group, and the like. The invite message may also enable the prospective user to either accept or deny the invite. For example, the invite message may include user interface elements, such as buttons, which the prospective user may use to select to either accept or deny the invite to join the authenticated group. The invite management component 208 may provide the generated invite message to the prospective user, such as via a message through the online service 106, via email, and the like.

After submitting an invite message to a prospective user, in some embodiments the invite management component 208 may place a restriction on issuing additional invites to join the authenticated group. For example, the authenticated group may be associated a maximum number of invite message that may be concurrently pending. If the invite management component 208 determines that a number of pending invite messages meets the maximum number, the invite management component 208 may close the authenticated group until one or more of conditions are triggered. For example, the conditions may include receiving a response from a prospective user either accepting or rejecting the invitation to join the authenticated group, an invitation being revoked, an invitation expiring, and the like. The invite management component 208 may reopen the authenticated group to further invitation once one or more of the conditions have been triggered.

The invite management component 208 receives a prospective user's response to an invite message. For example, the response may indicate whether the prospective user has accepted or rejected the invitation to join the authenticated group. If prospective user accepts the invitation, the invite management component 208 communicates with the group modification component 210 to add the prospective user to the authorized group. For example, the invite management component 208 provides the group modification component 210 with data identifying the prospective user and/or the account of the prospective user, data identifying the authenticated group, and an instruction to add the prospective user to authenticated group.

The group modification component 210 manages modifications to the membership of an authenticated group. This may include adding and/or removing members from an authenticated group. For example, the group modification component 210 accesses data associated with an authenticated group from the data storage 214 and modifies the data to cause a desired modification. For example, to add a member to an authenticated group, the group modification component 210 may modify the data in the data storage 214 to create a link between the user account of the member to the authenticated group and/or user accounts of the other members of the authenticated group. Alternatively, to remove a member from an authenticated group, the group modification component 210 may modify the data in the data storage 214 to remove the link between the user account of the member and the authenticated group and/or user accounts of the other members of the authenticated group.

The recommendation component 212 generates recommendations for members of an authenticated group. For example, the recommendation component 212 may recommend prospective users to be added to an authenticated group. The recommendation component 212 may identify prospective users to recommend for an authenticated group based on profile data of users of the online service 106. For example, the recommendation component 212 may identify users of the online service 106 that have similar interests, background, etc., to members of the authenticated group.

The recommendation component 212 may present the recommendations to the members of the authenticated group. For example, the recommendation component 212 may present a user interface that lists one or more recommended prospective users, including data identifying the prospective users, links to user accounts of the prospective users, and the like. The user interface may also include data identifying why each prospective user was recommended, such as by identifying similarities between the prospective users and members of the authenticated group. The user interface may also include a user interface element that enables the members to request to add any of the recommended prospective users to the authenticated group.

The recommendation component 212 may also generate recommendations for creating new authenticated groups. For example, the recommendation component 212 may identify users of the online service and/or within an authenticated group that are similar based on profile data of the users. The recommendation component 212 may present a user interface to the identified users that includes a recommendation that the users create an authenticated group, identifies the individual users, includes links to accounts of the users, identifies similarities shared by the identified users, and the like. The user interface may also include a user interface element that enables the members to create the new authenticated group, invite the other identified users to join the group, and the like.

Figure 3:
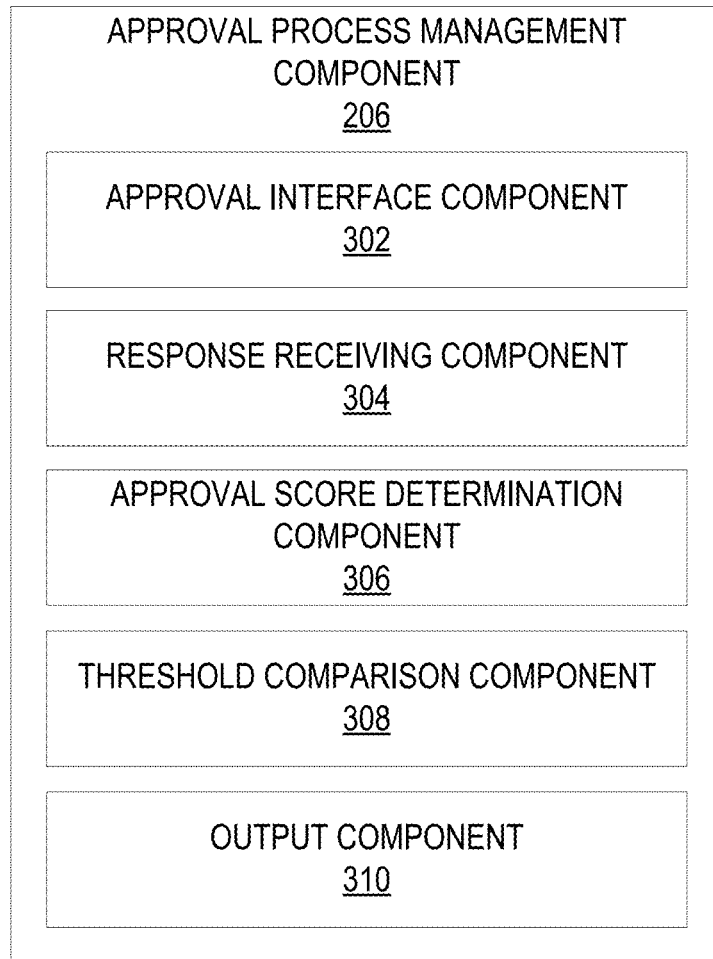
FIG. 3 is a block diagram of an approval process management component, according to some example embodiments.

FIG. 3 is a block diagram of an approval process management component 206, according to some example embodiments. To avoid obscuring the inventive subject matter with unnecessary detail, various functional components (e.g., modules, components) that are not germane to conveying an understanding of the inventive subject matter have been omitted from FIG. 3. However, a skilled artisan will readily recognize that various additional functional components may be supported by the approval process management component 206 to facilitate additional functionality that is not specifically described herein. Furthermore, the various functional components/modules depicted in FIG. 3 may reside on a single computing device or may be distributed across several computing devices in various arrangements such as those used in cloud-based architectures. For example, the various functional modules and components may be distributed amongst computing devices that facilitate both the authenticated group management system 108 and the online service 106.

The approval process management component 206 manages the approval process for adding prospective users to an authorized group. As shown, the approval process management component 206 includes an approval interface component 302, a response receiving component 304, an approval score determination component 306, a threshold comparison component 308 and an output component 310.

The approval interface component 302 provides an approval interface that is accessible to the members of the authorized group. The approval interface presents the members of the authorized group with data associated with the approval process, such as data identifying the prospective user, profile data associated with the prospective user, a link to the prospective user's profile, comments provided by members of the authorized group, instructions for providing feedback, an amount of time remaining to respond to the request, and the like. The approval interface also enables the members of the authorized group to provide feedback in relation to the prospective user, such as by providing comments and asking questions, as well as provide a response to the request to add the prospective user to the authorized group. For example, each member may provide a response to either approve or deny the request to add the prospective user to the authorized group.

The response receiving component 304 gathers the responses provided by the members of the authenticated group. Each response indicates whether a respective member of the authenticated group selected to approve of deny a request to add a prospective user to the authenticated group. Each response may also include data identifying the respective member of the group that provided the response. For example, the response may include a unique account identifier associated with the account of the authenticated group.

The approval score determination component 306 calculates an approval score based on the responses received from the members of the authenticated group. The approval score determination component 306 may determine the approval score based on a variety of factors. For example, approval score determination component 306 may determine the approval score based on the number of responses to approve the request, the number of responses to deny the request, the percentage of members that selected to approve the request, and the like.

The approval score determination component 306 may also apply weights to the responses when calculating the approval score. For example, the approval score determination component 306 may apply a weight to each response based on profile data associated with the member of the authenticated group that provided the response. Examples of the types of profile data than may be used to apply a weight include the date/time at which the member created an account with the online service 106, the date/time at which the member became a member of the authenticated group, a number of interactions (e.g., likes, comments, etc.) received in relation to content posted by the member, the amount of content posted by the member (e.g., number of posts, comments, etc.), and the like. The approval score determination component 306 provides the determined approval score to the threshold comparison component 308.

The threshold comparison component 308 uses the approval score to determine whether to approve or deny the request. For example, the threshold comparison component determines whether to approve or deny a request based on a comparison of the approval score to a threshold approval score. For example, the threshold comparison component 308 denies the request if the approval score is less than the threshold approval score. Alternatively, the threshold comparison component 308 approves the request if the approval score, meets or exceed the threshold approval score. The threshold comparison component 308 provides the output component 310 with a notification indicating whether a request was approved of denied.

The output component 310 provides an output based on whether a request was approved or denied. For example, the output component 310 may provide the member that initiated the request with a notification indicating whether the request was approved or denied. The output component 310 may also communicate with the invite management component 208 to cause an invite to be submitted to a prospective user that has been approved to join the authenticated group. For example, the output component 310 may provide the invite management component 208 with data identifying the prospective user, contact data associated with the prospective user, and the like.

Figure 4:
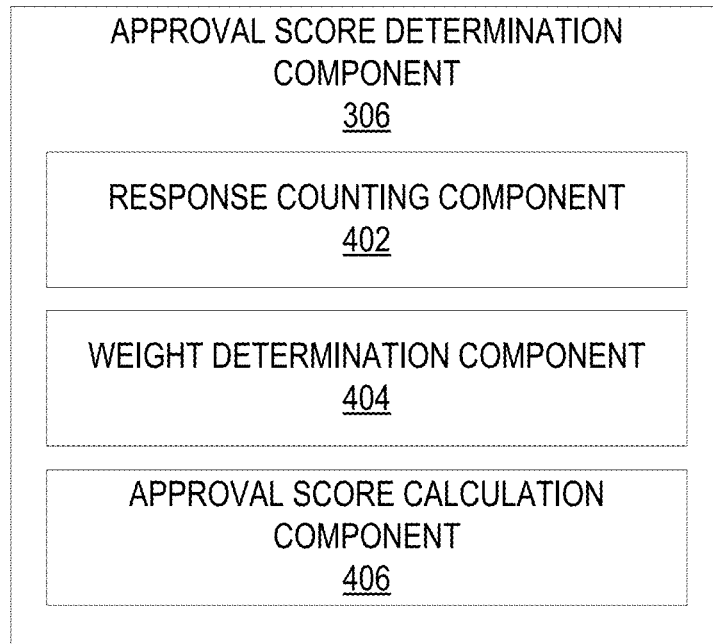
FIG. 4 is a block diagram of an approval score determination component, according to some example embodiments.

FIG. 4 is a block diagram of an approval score determination component 306, according to some example embodiments. To avoid obscuring the inventive subject matter with unnecessary detail, various functional components (e.g., modules, components) that are not germane to conveying an understanding of the inventive subject matter have been omitted from FIG. 4. However, a skilled artisan will readily recognize that various additional functional components may be supported by the approval score determination component 306 to facilitate additional functionality that is not specifically described herein. Furthermore, the various functional components/modules depicted in FIG. 4 may reside on a single computing device or may be distributed across several computing devices in various arrangements such as those used in cloud-based architectures. For example, the various functional modules and components may be distributed amongst computing devices that facilitate both the authenticated group management system 108 and the online service 106.

The approval score determination component 306 calculates an approval score based on the responses received from the members of the authenticated group. As shown, the approval score determination component 306 includes a response counting component 402, a weight determination component 404 and an approval score calculation component 406.

The response counting component 402 determines the number of positive responses received from the members of the authenticated group to approve a request and/or as a number of negative responses received from the members of the authenticated group to deny the request.

The weight determination component 404 applies weights to the responses based on profile data of the members of the authenticated group. The weights applied to the responses may provide greater weight to some responses and lesser weight to others based on one or more predetermined criteria.

In some embodiments, the weight determination component 404 may apply a weight to a response based on the date/time at which the member that provided the response created an account with the online service 106. For example, the weight determination component 404 may give greater weight to responses received from members of the authenticated group that have been users of the online service 106 for relatively longer periods of time and lesser weight to responses received from members of the authenticated group that have been users of the online service 106 for relatively shorter periods of time.

In some embodiments, the weight determination component 404 may apply a weight to a response based on date/time at which the member became a member of the authenticated group. For example, the weight determination component 404 may give greater weight to responses received from long standing members of the authenticated group and lesser weight to responses received from newer members of the authenticated group.

In some embodiments, the weight determination component 404 may apply a weight to a response based on a number and/or frequency of content interactions (e.g., likes, comments, etc.) that are associated with the member. For example, the weight determination component 404 may give greater weight to responses received from members of the authenticated group that have a relatively higher number and/or rate of interactions and lesser weight to responses received from members of the authenticated group that have a relatively lower number and/or rate of interactions.

These are just some examples and are not meant to be limiting. The weight determination component 404 may apply weights to the responses using any of a variety factors and combinations thereof.

The approval score calculation component 406 calculated the approval score based on the weighted responses. The approval score calculation component 406 may calculate the approval score using any of a variety of algorithms. For example, the approval score calculation component 406 may calculate the approval score based on the number of positive and negative responses, the percentage of responses that were positive, and the like.

Figure 5:
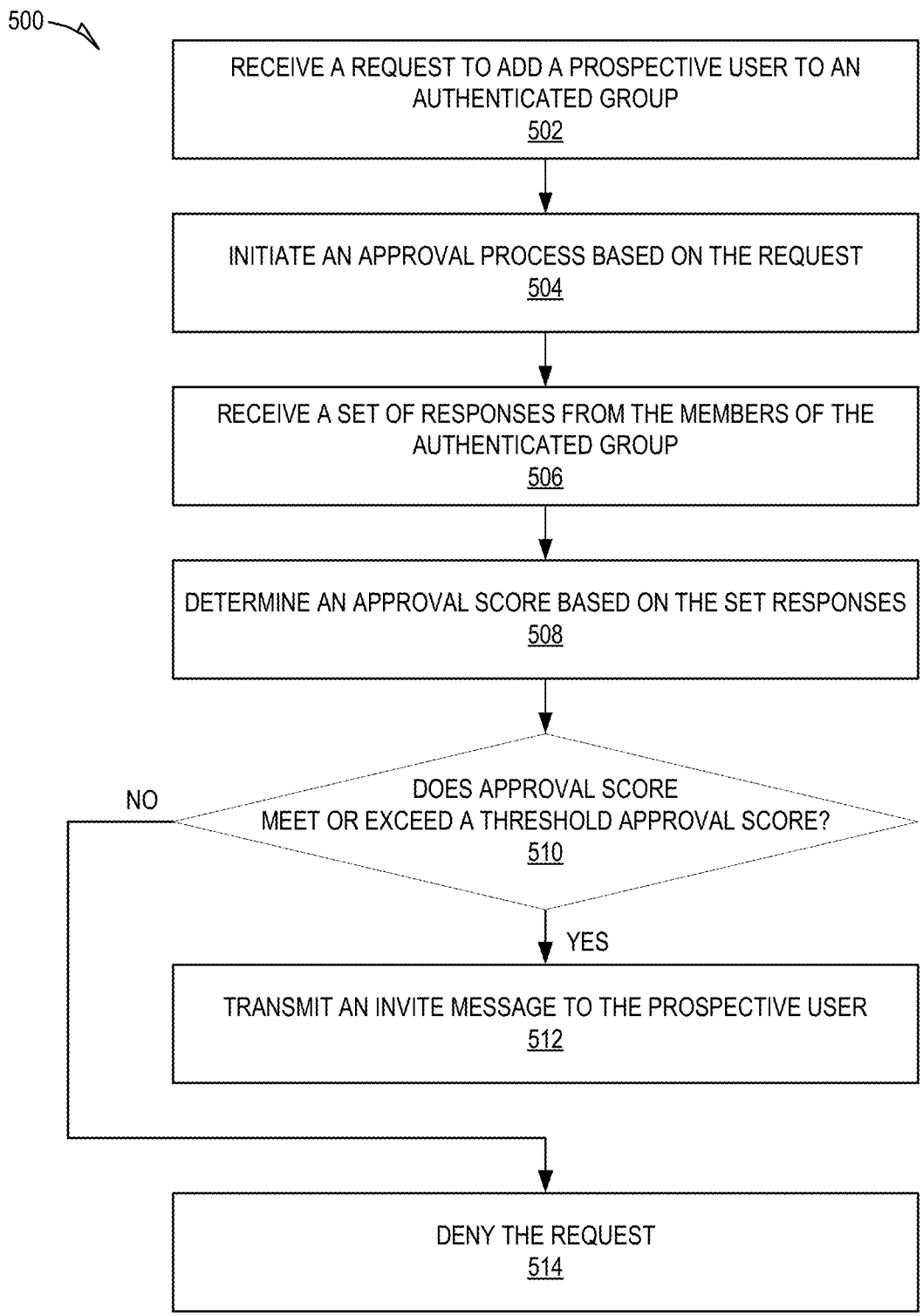
FIG. 5 is a flowchart showing a method for content source verification and authentication using linked accounts, according to some example embodiments.

FIG. 5 is a flowchart showing a method 500 for content source verification and authentication using linked accounts, according to some example embodiments. The method 500 may be embodied in computer readable instructions for execution by one or more processors such that the operations of the method 500 may be performed in part or in whole by the authenticated group management system 108; accordingly, the method 500 is described below by way of example with reference thereto. However, it shall be appreciated that at least some of the operations of the method 500 may be deployed on various other hardware configurations and the method 500 is not intended to be limited to the authenticated group management system 108.

At operation 502, the request management component 204 receives a request to add a prospective user to an authenticated group. The request may include data identifying the prospective user and/or an account of the prospective user.

At operation 504, the approval process management component 206 initiates an approval process based on the request. For example, the approval process management component 206 provides an approval interface that is accessible to the members of the authorized group. The approval interface presents the members of the authorized group with data associated with the approval process, such as data identifying the prospective user, profile data associated with the prospective user, a link to the prospective user's profile, comments provided by members of the authorized group, instructions for providing feedback, an amount of time remaining to respond to the request, and the like. The approval interface also enables the members of the authorized group to provide feedback in relation to the prospective user, such as by providing comments and asking questions, as well as provide a response to the request to add the prospective user to the authorized group. For example, each member may provide a response to either approve or deny the request to add the prospective user to the authorized group.

At operation 506, the response receiving component 304 receives a set of responses from the members of the authenticated group. Each response indicates whether a respective member of the authenticated group selected to approve or deny a request to add a prospective user to the authenticated group. Each response may also include data identifying the respective member of the group that provided the response. For example, the response may include a unique account identifier associated with the account of the authenticated group.

At operation 508, the approval score determination component 306 determines an approval score based on the set of responses. The approval score determination component 306 calculates an approval score based on the responses received from the members of the authenticated group. The approval score determination component 306 may determine the approval score based on a variety of factors. For example, approval score determination component 306 may determine the approval score based on the number of responses to approve the request, the number of responses to deny the request, the percentage of members that selected to approve the request, and the like.

The approval score determination component 306 may also apply weights to the responses when calculating the approval score. For example, the approval score determination component 306 may apply a weight to each response based on profile data associated with the member of the authenticated group that provided the response. Examples of the types of profile data than may be used to apply a weight include the date/time at which the member created an account with the online service 106, the date/time at which the member became a member of the authenticated group, a number of interactions (e.g., likes, comments, etc.) received in relation to content posted by the member, the amount of content posted by the member (e.g., number of posts, comments, etc.), and the like. The approval score determination component 306 provides the determined approval score to the threshold comparison component 308.

At operation 510, the threshold comparison component 308 determines whether the approval score meets or exceeds a threshold approval score. If the threshold comparison component 308 determines that the approval score meets or exceeds the threshold approval score, the method continues to operation 512 at which the invite management component 208 transmits an invite message to the prospective user. Alternatively, if the threshold comparison component 308 determines that the approval score does not meet or exceed the threshold approval score (e.g., is less than the threshold approval score), the method continues to operation 514 at which the threshold comparison component 308 denies the request.

Figure 6:
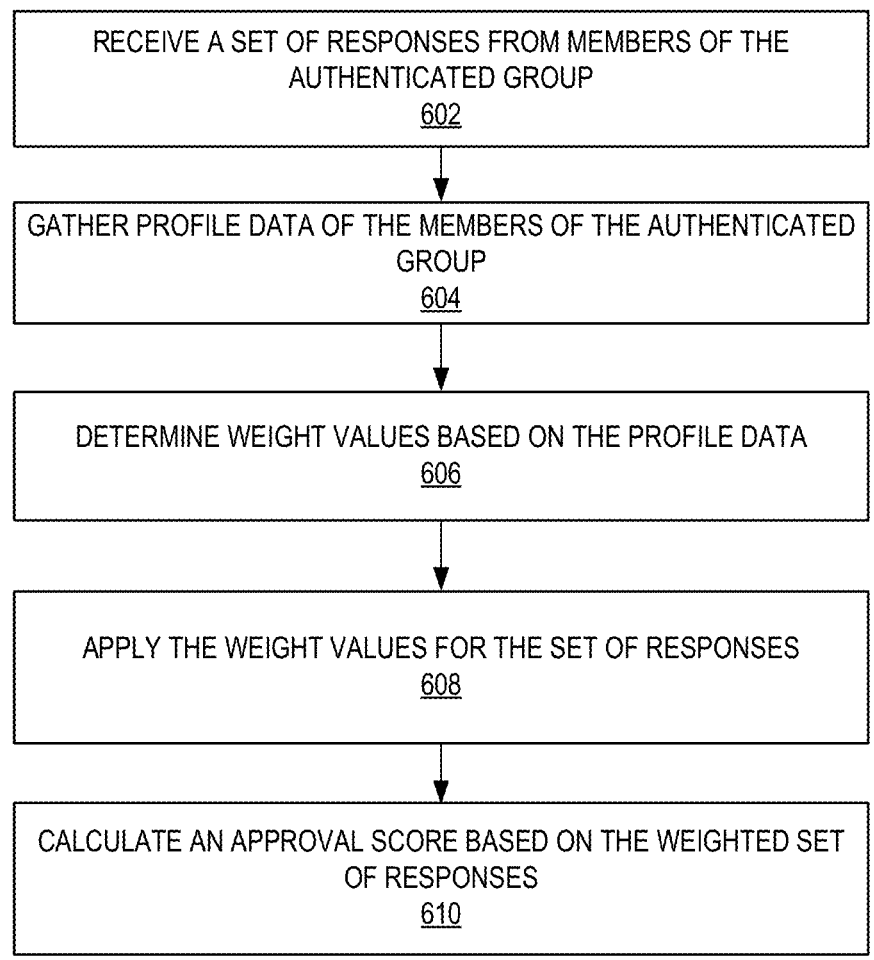
FIG. 6 is a flowchart showing a method for determining an approval score based on a set of responses, according to some example embodiments.

FIG. 6 is a flowchart showing a method 600 for determining an approval score based on a set of responses, according to some example embodiments. The method 600 may be embodied in computer readable instructions for execution by one or more processors such that the operations of the method 600 may be performed in part or in whole by the authenticated group management system 108; accordingly, the method 600 is described below by way of example with reference thereto. However, it shall be appreciated that at least some of the operations of the method 600 may be deployed on various other hardware configurations and the method 600 is not intended to be limited to the authenticated group management system 108.

At operation 602, the response receiving component 304 receives a set of responses from members of the authenticated group. Each response may be associated with one member of the authenticated group and indicate whether the member selected to approve or deny the request to add the prospective user to the authenticated group. Each response indicates whether a respective member of the authenticated group selected to approve or deny a request to add a prospective user to the authenticated group. Each response may also include data identifying the respective member of the group that provided the response. For example, the response may include a unique account identifier associated with the account of the authenticated group.

At operation 604, the weight determination component 404 gathers profile data of the members of the authenticated group.

At operation 606, the weight determination component 404 determines weight values for the set of responses. The weights applied to the responses may provide greater weight to some responses and lesser weight to others based on one or more predetermined criteria, such as how long a member has been a user of the online service 106, how long a member has been a member of the authenticated group, a number and/or rate of interaction associated with the member, and the like.

At operation 608, the approval score calculation component 406 calculates an approval score based on the weighted set of responses. The approval score calculation component 406 may calculate the approval score using any of a variety of algorithms. For example, the approval score calculation component 406 may calculate the approval score based on the number of positive and negative responses, the percentage of responses that were positive, and the like.

Figure 7:
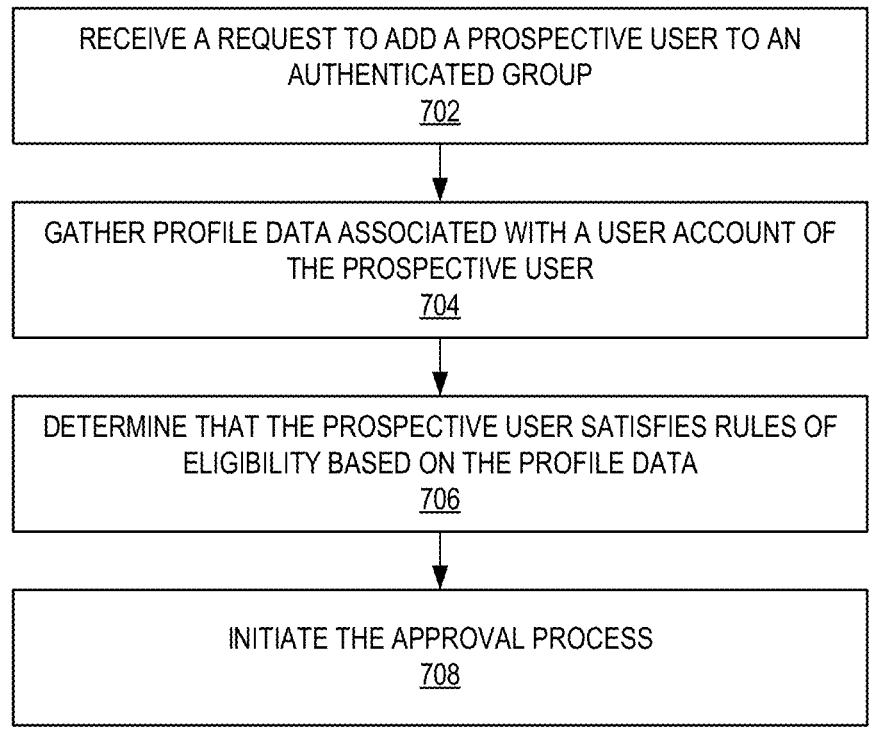
FIG. 7 is a flowchart showing a method of initiating an approval process based on rules of eligibility, according to some example embodiments.

FIG. 7 is a flowchart showing a method 700 of initiating an approval process based on rules of eligibility, according to some example embodiments. The method 700 may be embodied in computer readable instructions for execution by one or more processors such that the operations of the method 700 may be performed in part or in whole by the authenticated group management system 108; accordingly, the method 700 is described below by way of example with reference thereto. However, it shall be appreciated that at least some of the operations of the method 700 may be deployed on various other hardware configurations and the method 700 is not intended to be limited to the authenticated group management system 108.

At operation 702, the request management component 204 receives a request to add a prospective user to an authenticated group. For example, the request may be received via a request interface facilitated by the request management component 204.

At operation 704, the request management component 204 gathers profile data associated with a user account of the prospective user. For example, the request management component 204 may use data entered in the request, such as data identifying an account of the prospective user, to access information about the prospective user from the data storage 214. This may include user profile data, connection data, and the like.

At operation 706, the request management component 204 determines that the prospective user satisfies rules of eligibility based on the profile data. In some embodiments, the request management component 204 may enforce restrictions related to eligibility of a prospective new user. For example, an authorized group may be associated with one or rules of eligibility that limit the pool of prospective users that may be added to the authorized group. The request management component 204 may confirm that a prospective user satisfies the rules of eligibility (e.g., is eligible for consideration) prior to initiation of the approval process. The request management component 204 uses the accessed information to determine whether the rules of eligibility have been satisfied.

At operation 708, the approval process management component 206 initiates the approval process. If the request management component 204 determines that the rules of eligibility have not been satisfied (e.g., the prospective user is not eligible), the request management component 204 may cause a notification indicating that the request cannot be processed. Alternatively, if the request management component 204 determines that a prospective user is eligible (e.g., the rules of eligibility have been satisfied), the request management component 204 may communicate with the approval process management component 206 to initiate the approval process. For example, the request management component 204 may provide the approval process management component 206 with data included in the request, such as data identifying the prospective user, the account of the prospective user, data identifying the requesting member of the authenticated group, comments provided by the requesting member of the authenticated group, and the like.

Figure 8:
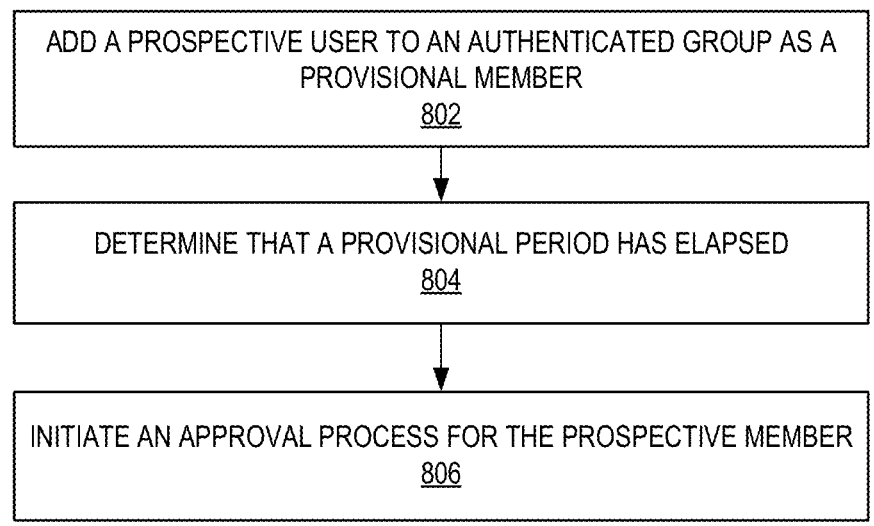
FIG. 8 is a flowchart showing a method of adding a provisional account to the authenticated account group, according to some example embodiments.

FIG. 8 is a flowchart showing a method 800 of adding a provisional account to the authenticated account group, according to some example embodiments. The method 800 may be embodied in computer readable instructions for execution by one or more processors such that the operations of the method 800 may be performed in part or in whole by the authenticated group management system 108; accordingly, the method 800 is described below by way of example with reference thereto. However, it shall be appreciated that at least some of the operations of the method 800 may be deployed on various other hardware configurations and the method 800 is not intended to be limited to the authenticated group management system 108.

At operation 802, the group modification component 210 adds a prospective user to an authenticated group as a provisional member. In some embodiments, a prospective user may be added to an authorized group for a provisional period of time. This may occur prior to the prospective user being approved through an approval process or prior to initiation of an approval process. Adding a prospective user as a provisional member allows the members of the authenticated group to further evaluate the provisional member. In some embodiments, the provisional member may be provided limited access to content shared by the other members of the authenticated group and/or be limited from sharing content with the authenticated group.

A provisional membership may be limited to a provisional time period after which the provisional membership ends. For example, the provisional membership may be limited to a specified period of time, a specified amount of interaction, and the like. For example, the provisional membership may expire once the provisional member has accessed a specified amount of shared content, shared a specified amount of content, performed a specified number of interaction, etc.

At operation 804, the approval process management component 204 determines that a provisional period has elapsed. For example, the approval process management component 204 may determine that a specified period of time has elapses, the provisional member has performed a specified number of interactions, and the like.

At operation 806, the approval process management component 204 initiates an approval process for the prospective member.

Figure 9:
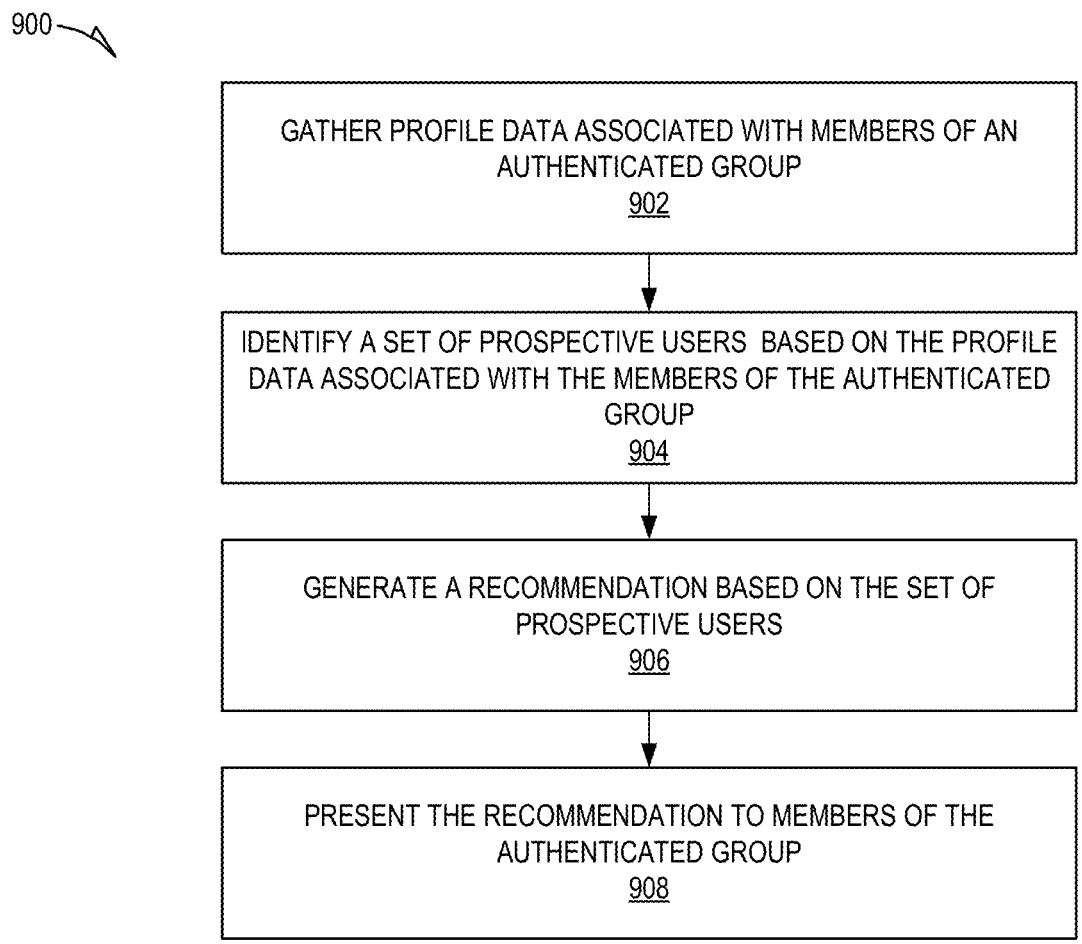
FIG. 9 is a flowchart showing a method of generating a recommendation including prospective users for an authenticated group, according to some example embodiments.

FIG. 9 is a flowchart showing a method 900 of generating a recommendation including prospective users for an authenticated group, according to some example embodiments. The method 900 may be embodied in computer readable instructions for execution by one or more processors such that the operations of the method 900 may be performed in part or in whole by the authenticated group management system 108; accordingly, the method 900 is described below by way of example with reference thereto. However, it shall be appreciated that at least some of the operations of the method 900 may be deployed on various other hardware configurations and the method 900 is not intended to be limited to the authenticated group management system 108.

At operation 902, the recommendation component 212 gathers profile data associated with members of an authenticated group. For example, the recommendation component 212 accesses the profile data for the members of the authenticated group from the data storage 214.

At operation 904, the recommendation component 212 identifies a set of prospective users based on the profile data associated with the members of the authenticated group. For example, the recommendation component 212 may identify users of the online service 106 that have similar interests, background, etc., to members of the authenticated group. To accomplish this, the recommendation component 212 accesses profile data of users of the online service 106 from the data storage 214. The recommendation component 212 may then identify similarities between the users of the online service 106 and members of the authenticated group, such as user that have similar listed interests as members of the authenticated group, live in similar geographic locations, have attended similar schools, work in similar industries, and the like.

At operation 906, the recommendation component 212 generates a recommendation based on the set of prospective users. The recommendation may include data identifying the prospective users, links to user accounts of the prospective users, and the like. The recommendation may also include data identifying why each prospective user was recommended, such as by identifying similarities between the prospective users and members of the authenticated group.

At operation 908, the recommendation component 212 presents the recommendation to members of the authenticated group. For example, the recommendation may be presented to members of the authenticated group within a user interface. The user interface may also include a user interface element that enables all members to request to add any of the recommended prospective users to the authenticated group. In some embodiments, the recommendation component 212 presents the recommendation to a subset of the members of the authenticated groups, such as the member that created the authenticated group, original members of the authenticated group, and the like.

Figure 10:
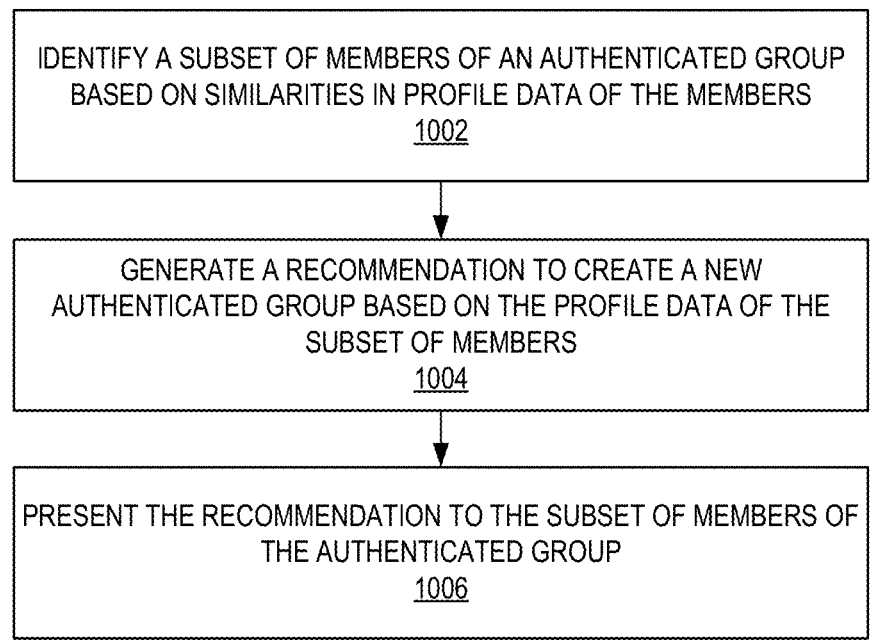
FIG. 10 is a flowchart showing a method of generating a recommendation to create an authenticated group, according to some example embodiments.

FIG. 10 is a flowchart showing a method 1000 for determining an approval score based on a set of responses, according to some example embodiments. The method 1000 may be embodied in computer readable instructions for execution by one or more processors such that the operations of the method 1000 may be performed in part or in whole by the authenticated group management system 108; accordingly, the method 1000 is described below by way of example with reference thereto. However, it shall be appreciated that at least some of the operations of the method 1000 may be deployed on various other hardware configurations and the method 1000 is not intended to be limited to the authenticated group management system 108.

At operation 1002, the recommendation component 212 identifies a subset of members of an authenticated group based on similarities in profile data of the members. For example, the recommendation component 212 accesses profile data for the members of the authenticated group from the data storage 214. The recommendation component 212 may then identify similarities between the members, such as members having similar listed interests, living in similar geographic locations, having attended similar schools, working in similar industries, and the like.

At operation 1004, the recommendation component 212 generates a recommendation to create a new authenticated group based on the profile data of the subset of members. The recommendation may include a recommendation that the members create an authenticated group. The recommendation may also identify the individual members, includes links to accounts of the members, and the like. The recommendation may also identify a reason for the recommendation, such as by identifying similarities shared by the identified members.

At operation 1006, the recommendation component 212 presents the recommendation to the subset of members of the authenticated group. For example, the recommendation may be presented to the members within a user interface. The user interface may include a user interface element that enables the members to create a new authenticated group, invite the other identified members to join the authenticated group, and the like.

Figure 11A:
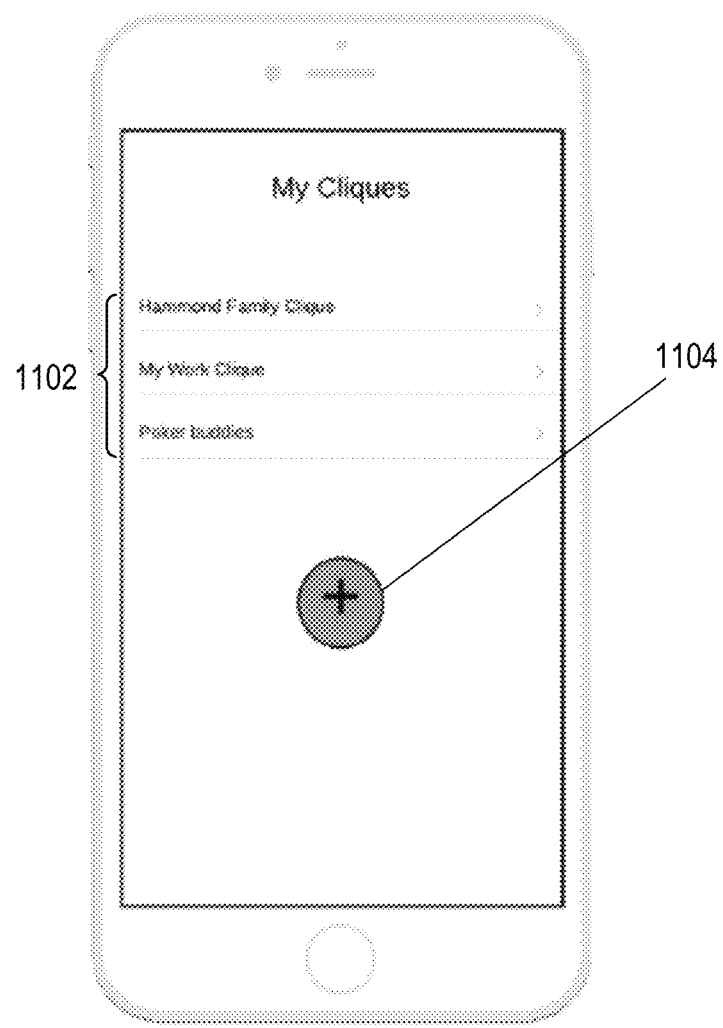
FIGS. 11A & 11B are screenshot of generating an authenticated group, according to some example embodiments.
Figure 11B:
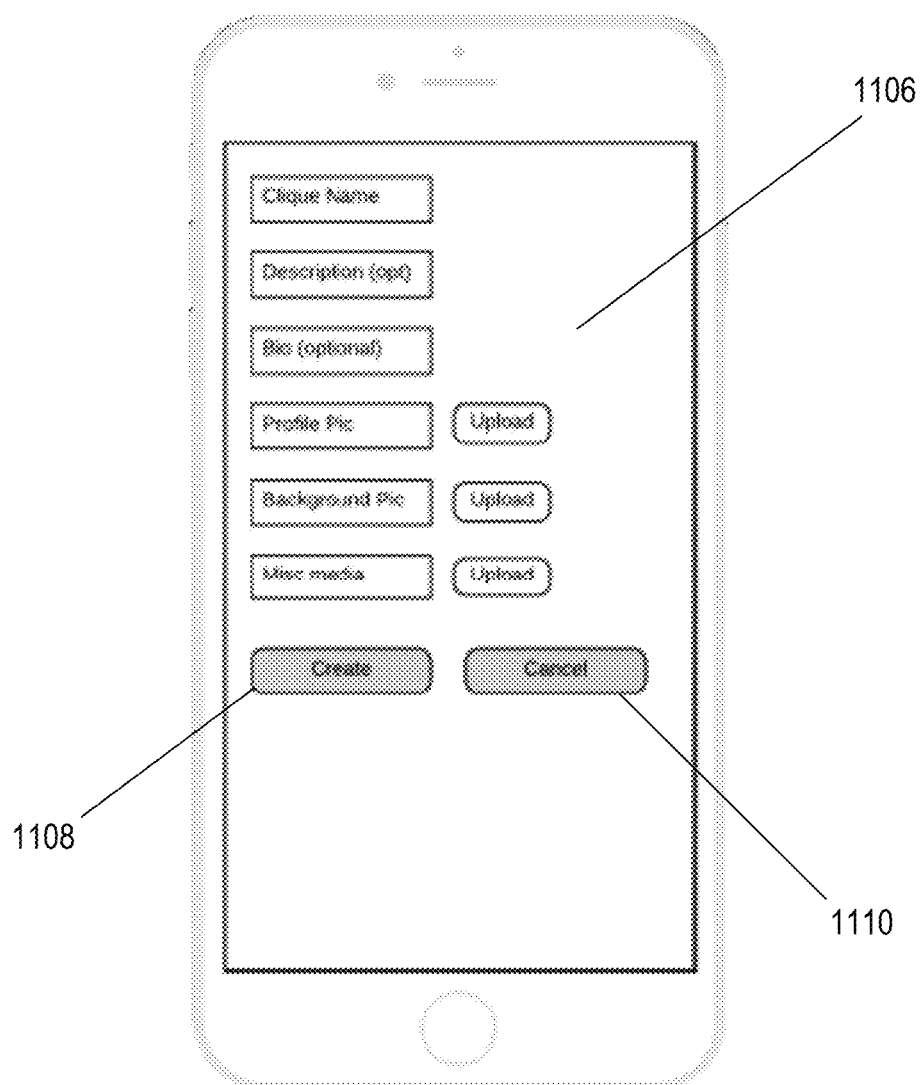

FIGS. 11A and 11B are screenshot of generating an authenticated group, according to some example embodiments. FIG. 11A shows an interface 1102 listing the authenticated groups to which a user of the online service 106 is a member. Three authenticated groups "Hammond Family Clique," "My Work Clique," and "Poker Buddies," are listed. The user may access any of the listed authenticated groups by selecting the listed authenticated group on the interface 1102.

The interface 1102 also includes an add authenticated group button 1104. The user may select the add authenticated group button 1104 to create a new authenticated group.

FIG. 11B shows a group creation user interface 1106 that enables users of the online service 106 to initiate creation of a new authenticated group. The group creation user interface 1106 may be presented in response to a user selecting the add authenticated group button 1104 shown in FIG. 11A.

The group creation user interface 1106 includes user interface elements that enable the user to create a new authenticated group. For example, the group creation user interface 1106 includes text boxes to enter a name, description and bio for the new authenticated group. The group creation user interface 1106 also enables a user to upload a profile picture, background picture and miscellaneous media. The group creation user interface 1106 incudes a create button 1108 and a cancel button 1110. Selection of the create button 1108 causes a new authenticated group to be created based on the data provides into the group creation user interface 1106. Alternatively, the cancel button 1110 can be selected to terminate the group creation process.

FIGS. 12A-12G are screenshots of modifying membership of an authenticated group, according to some example embodiments.

Figure 12A:
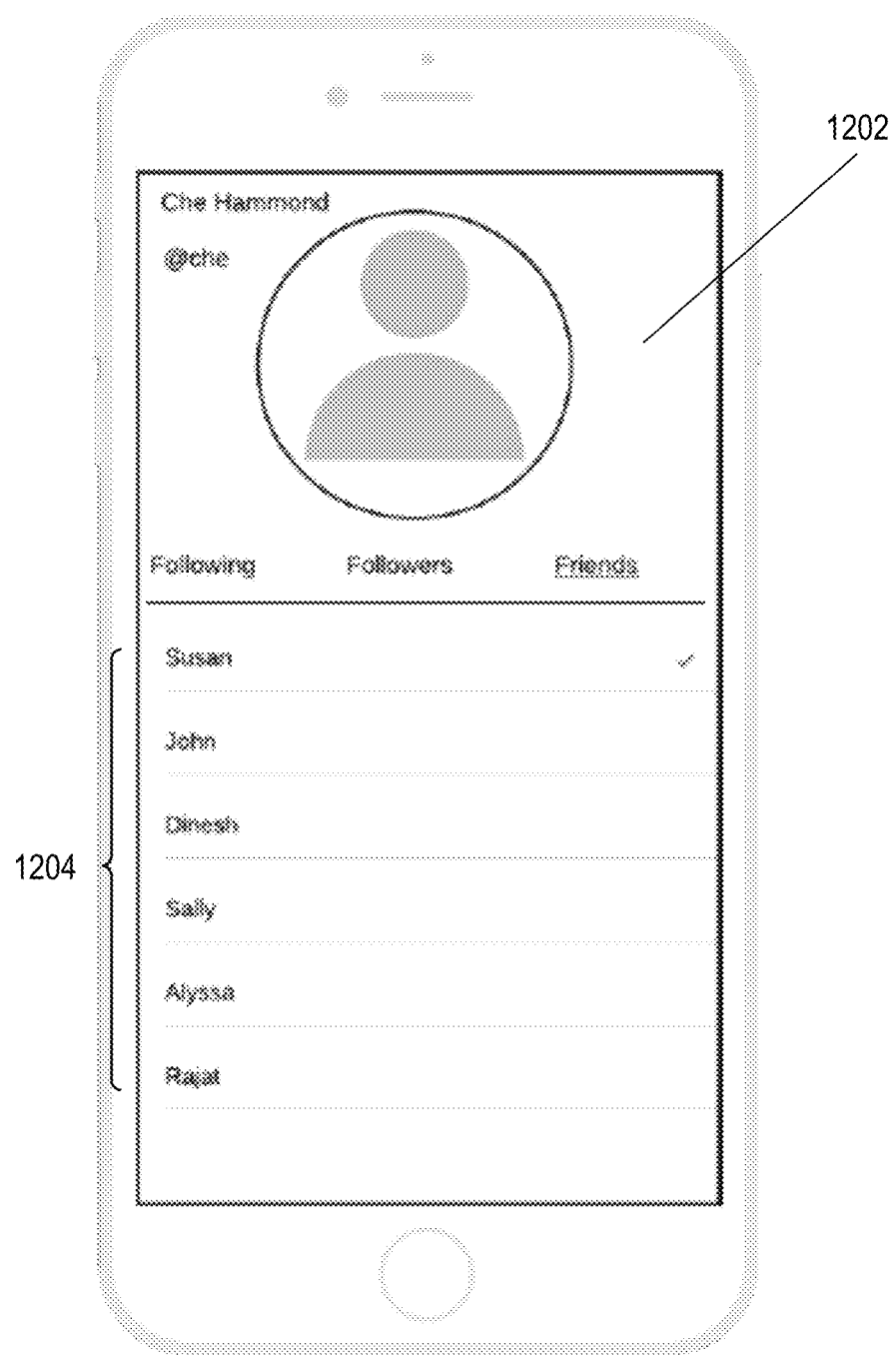
FIGS. 12A-12G are screenshots of modifying membership of an authenticated group, according to some example embodiments.

FIG. 12A shows a request interface 1202 for adding a prospective user to an authorized group. As shown, the request interface 1202 includes a listing of prospective users 1204 that may be selected to initiate a request to add the selected prospective user to the authorized group. For example, the listing of prospective users 1204 may include users that are connections (e.g., friends, followers, etc.) of the member of the authenticated group. The member may select any of the listed prospective users to initiate a request to add the prospective user to the authorized group.

Figure 12B:
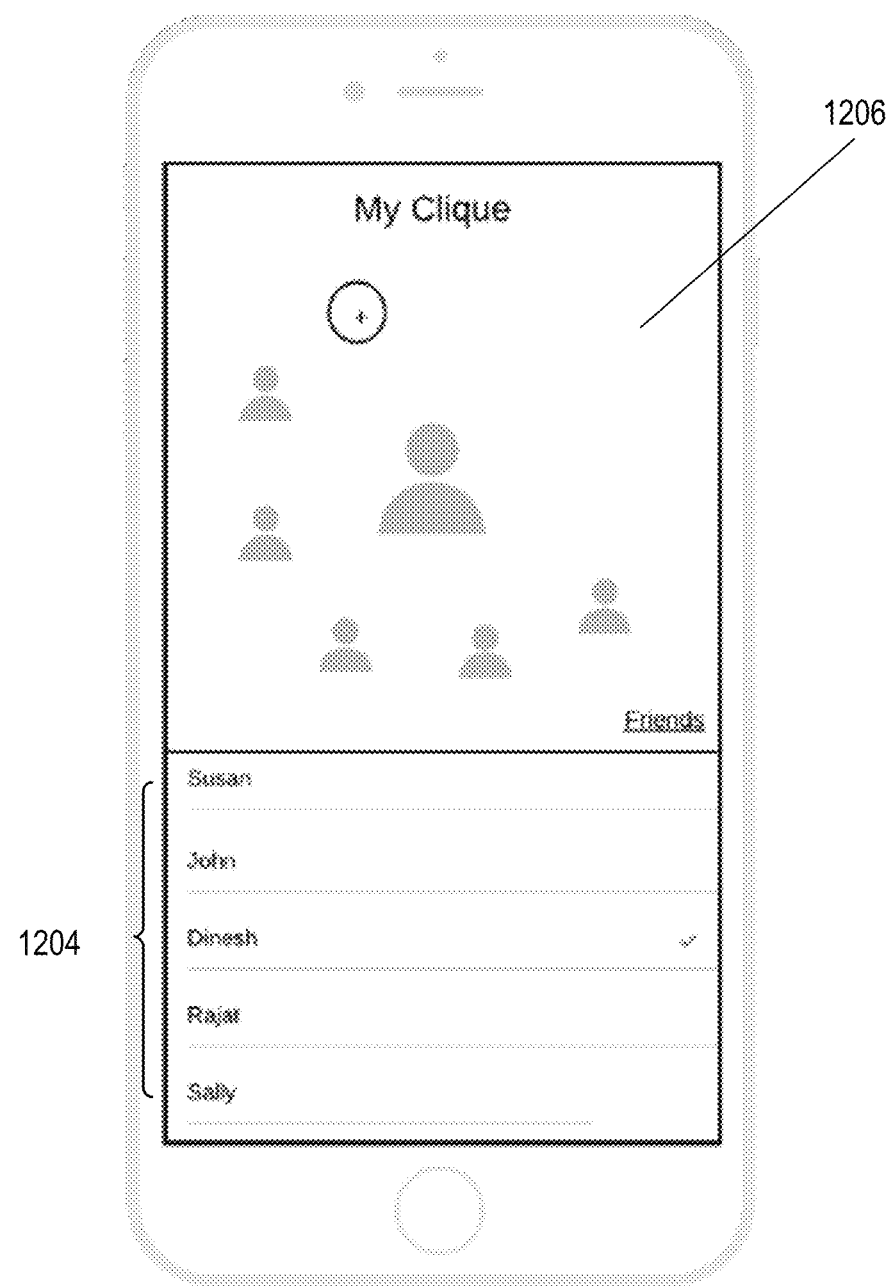

FIG. 12B shows another version of the request interface 1206 for adding a prospective user to an authorized group. Similar to the request interface 1202 shown in FIG. 12A, the request interface 1206 shown in FIG. 12B also includes a listing of prospective users 1204 that may be selected to initiate a request to add the selected prospective user to the authorized group. For example, the listing of prospective users 1204 may include users that are connections (e.g., friends, followers, etc.) of the member of the authenticated group. The member may select any of the listed prospective users to initiate a request to add the prospective user to the authorized group.

Figure 12C:
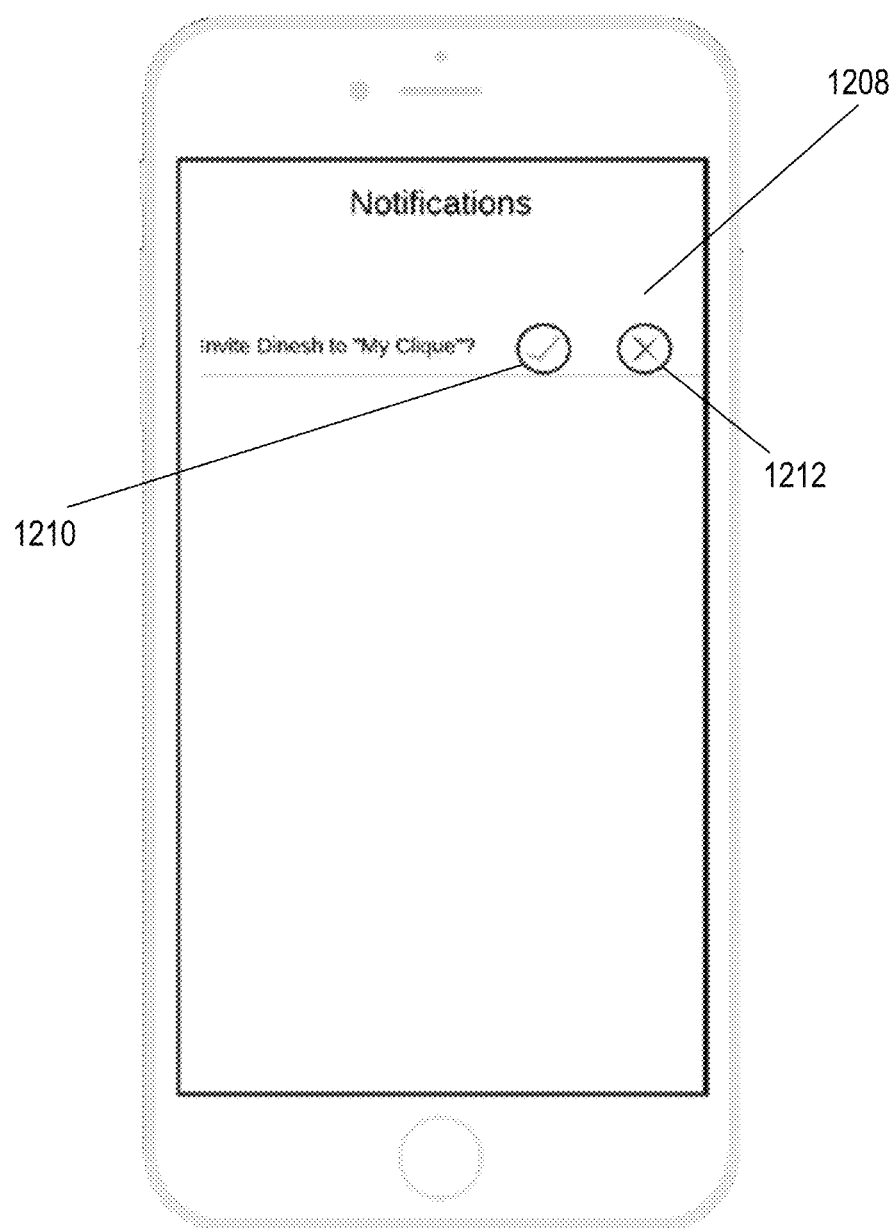

FIG. 12C shows an approval interface 1208 presented to members of an authorized group during an approval process. As show, the approval interface 1208 identifies the prospective user (e.g., Dinesh) and prompts members of the authorized group to select to either approval of a deny the request to add the prospective user to the authenticated group. The approval interface 1208 may be presented to members of the authenticated group during the approval process. For example, the approval interface 1208 may be presented as a result of a member of an authenticated group initiating a request to add the prospective user to the authenticated group using a request interface 1202, 1206, as shown in FIGS. 12A and 12B.

The approval interface 1208 enables each member of an authenticated group to review and respond to requests to add a prospective user to the authenticated group. For example, the approval interface 1208 includes an approve button 1210 and a deny button 1212 that allows a member to select to either approve or deny the request. For example, a member of the authenticated group may select the approve button 1210 to approve the request. Alternatively, the member of the authenticated group may select the deny button 1212 to deny the request.

Figure 12D:
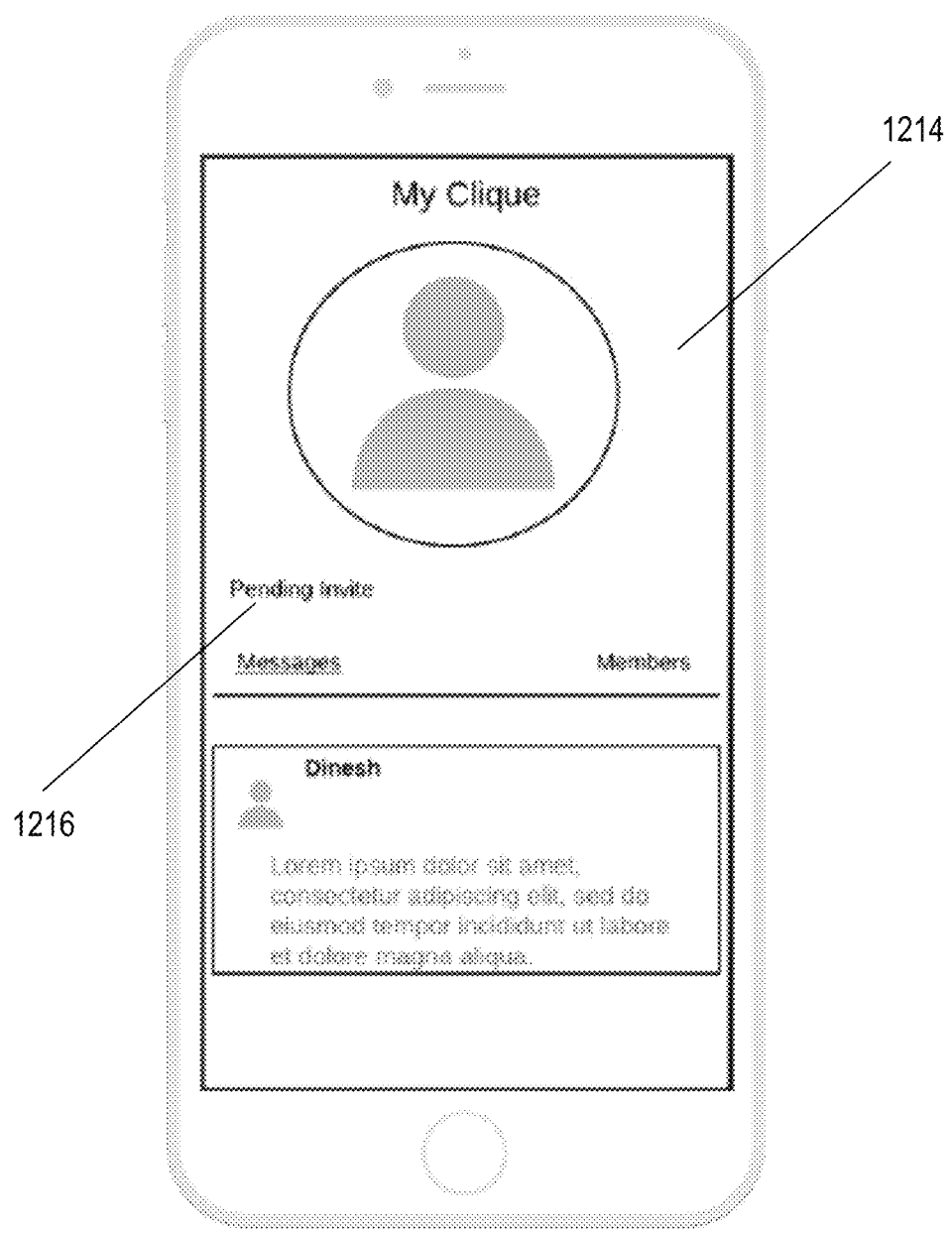

FIG. 12D shows a notification 1214 indicating that an invite message has been transmitted to a prospective user. As shown, the notification 1214 includes a status message 1216 indicating that an invite is pending.

Figure 12E:
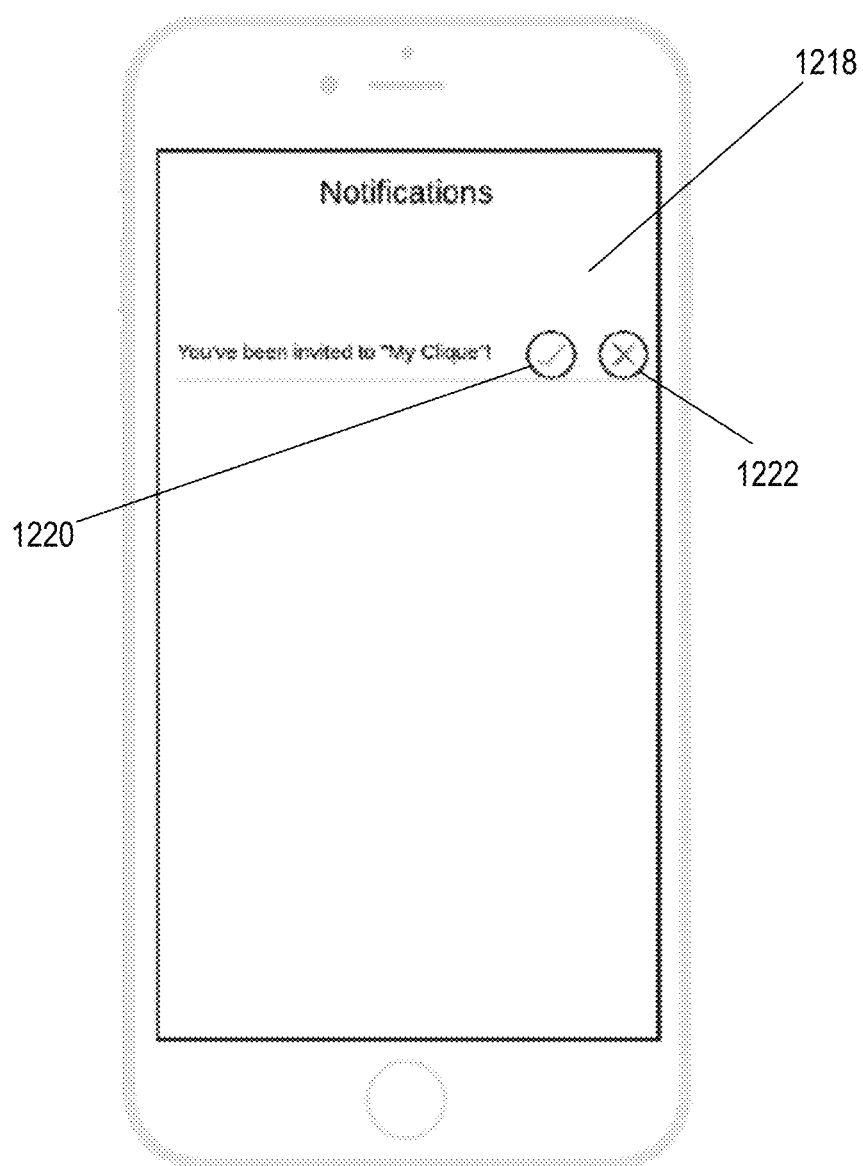

FIG. 12E shows an invite message 1218 that invites an prospective user to join an authenticated group. The invite message 1218 may be presented to the prospective user after completion of an approval process. The invite message 1218 enables the prospective user to either accept or decline the invitation to join the authenticate group. For example, the invite message includes an accept button 1220 and a decline button 1222. The prospective user may accept the invitation to join the authenticated group by selection the accept button 1220 or, alternatively, decline the invitation to join the authenticated group by selecting decline button 1222. If the prospective user accepts the invitation, the prospective user is added as a member of the authenticated group. Alternatively, if the prospective user declines the invitation, the prospective user is not added as a member of the authenticated group.

Figure 12F:
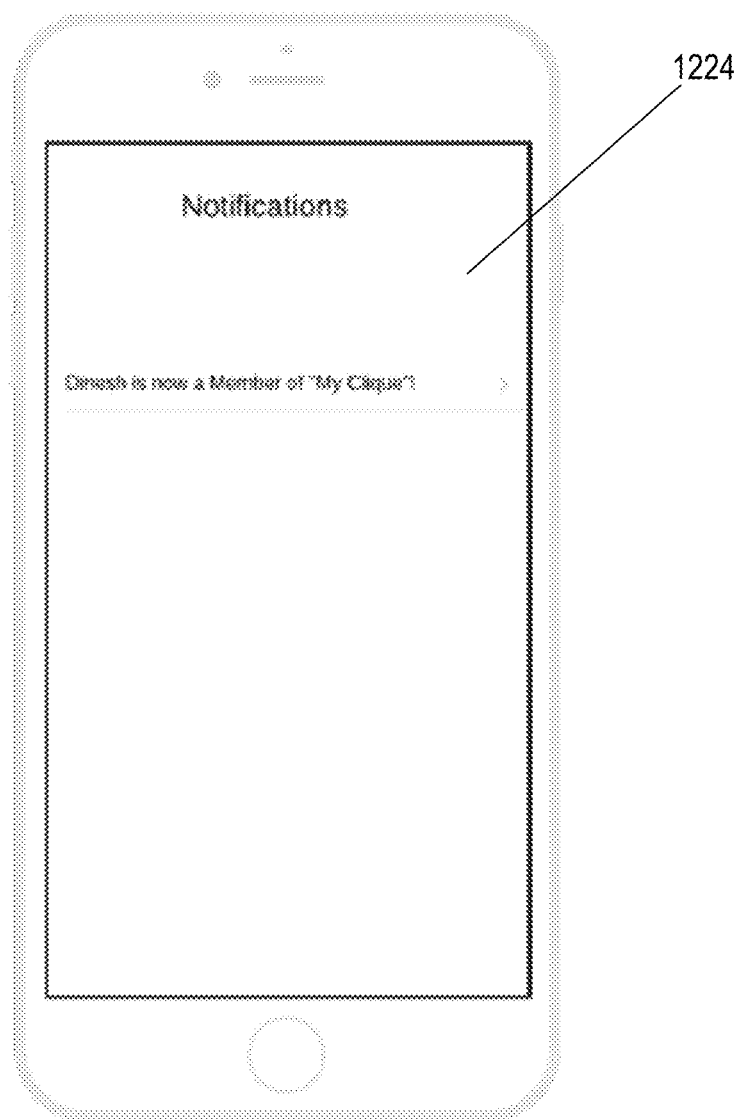

FIG. 12F shows a new member notification 1224 presented to members of an authenticated group. As shown, the new member notification 1224 presents a message indicating that the prospective user accepted the invitation to join the authenticated group and is now a member of the authenticated group.

Figure 12G:
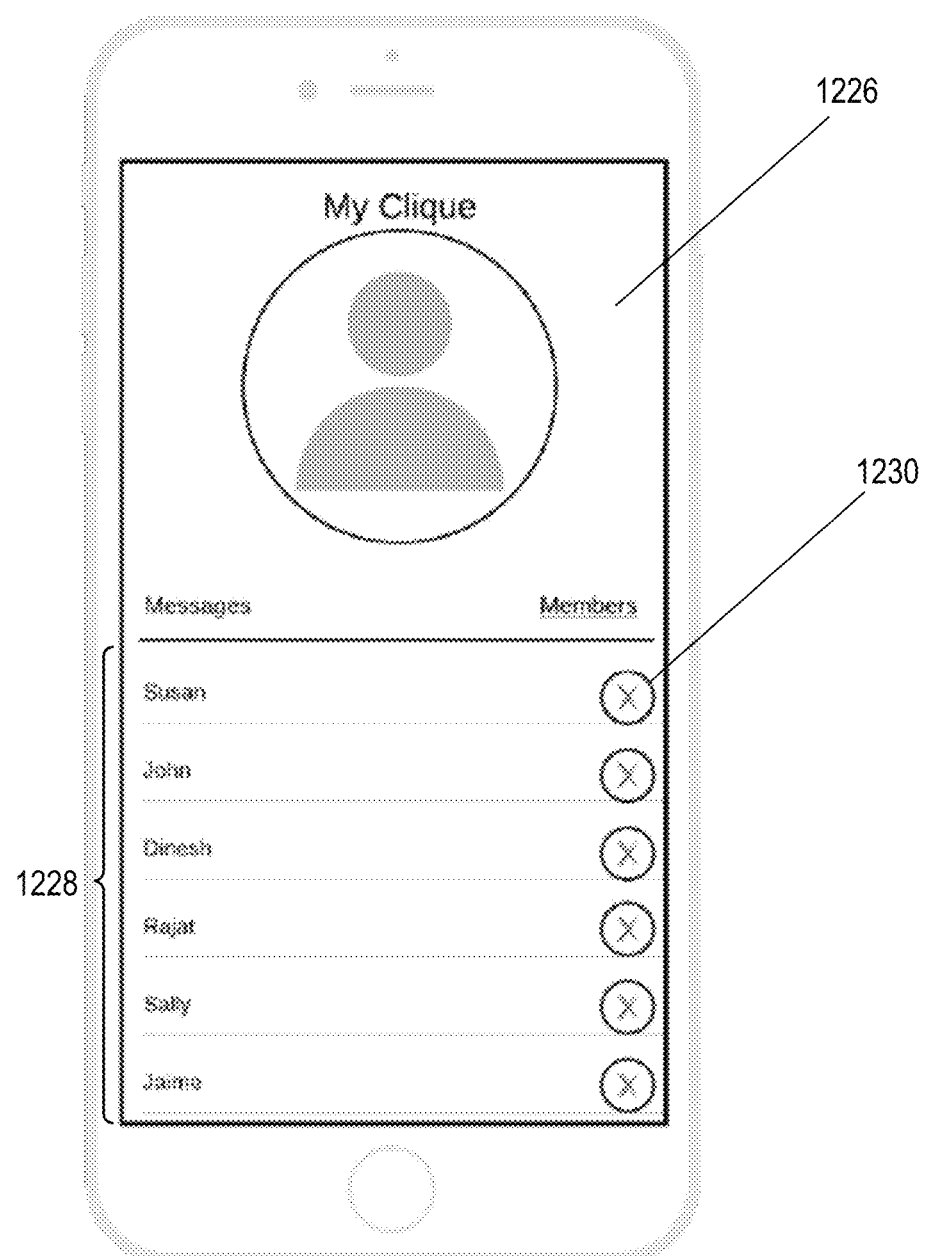

FIG. 12G shows the member modification interface 1226 for modifying the membership of an authenticated group. As shown, the member modification interface 1226 presents a listing of members of the group 1228. Each listed member in the listing of members is presented along with a corresponding removal button 1230. Each removal button 1230 may be selected to cause the member corresponding to the removal button 1230 to be removed from the authenticated group.

Software Architecture

Figure 13:
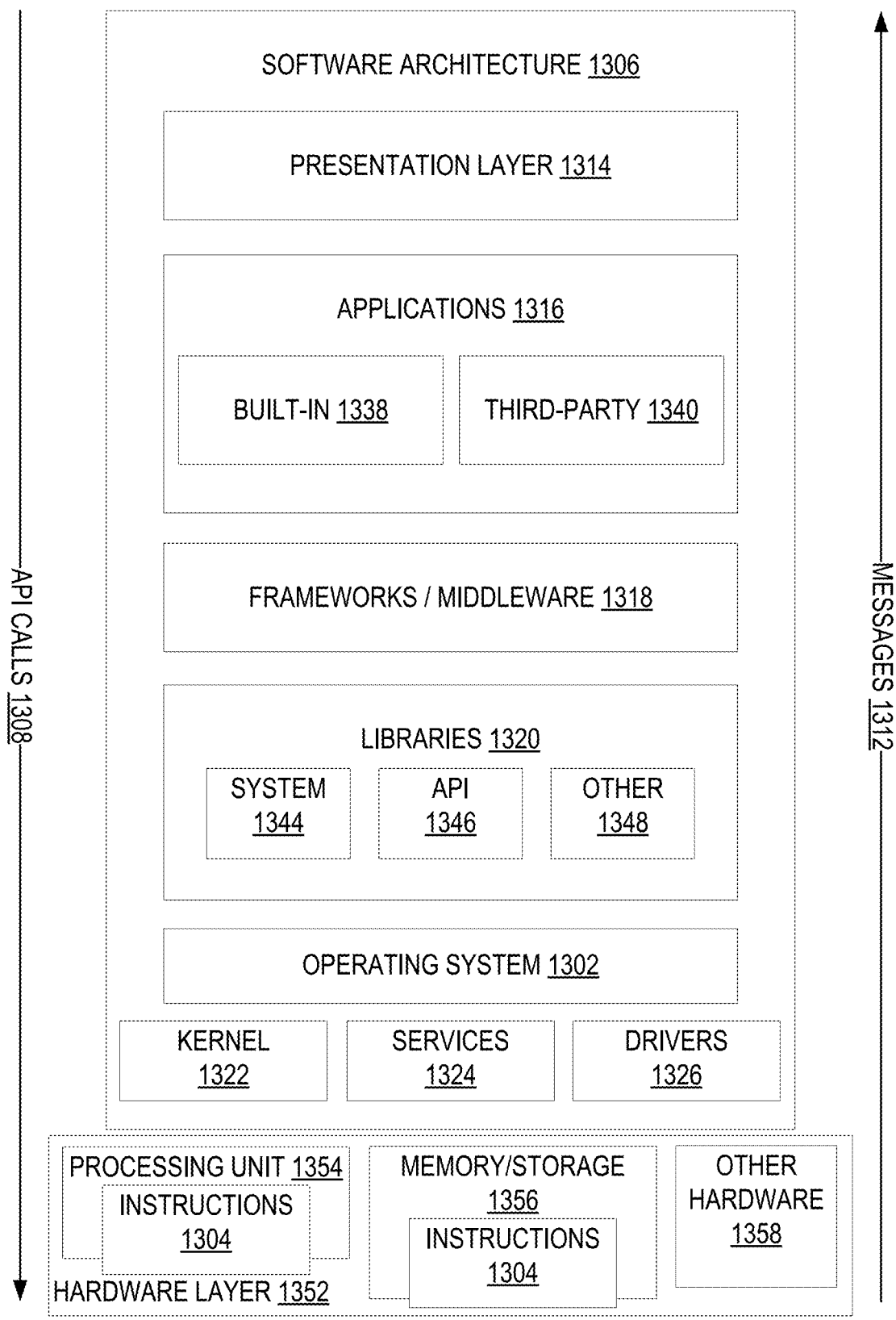
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture 1306 and it will be appreciated that many other architectures may be implemented to facilitate the functionality described herein. The software architecture 1306 may execute on hardware such as machine 1400 of FIG. 14 that includes, among other things, processors 1404, memory 1414, and (input/output) I/O components 1418. A representative hardware layer 1352 is illustrated and can represent, for example, the machine 1400 of FIG. 14. The representative hardware layer 1352 includes a processing unit 1354 having associated executable instructions 1304. Executable instructions 1304 represent the executable instructions of the software architecture 1306, including implementation of the methods, components, and so forth described herein. The hardware layer 1352 also includes memory and/or storage modules 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke application programming interface (API) calls 1308 through the software stack and receive a response such as messages 1312 in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphical user interface (GUI) functions, high-level resource management, high-level location services, and so forth. The frameworks/middleware 1318 may provide a broad spectrum of other APIs that may be used by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324, and/or drivers 1326), libraries 1320, and frameworks/middleware 1318 to create UIs to interact with users of the system. Alternatively, or additionally, in some systems, interactions with a user may occur through a presentation layer, such as presentation layer 1314. In these systems, the application/component "logic" can be separated from the aspects of the application/component that interact with a user.

Figure 14:
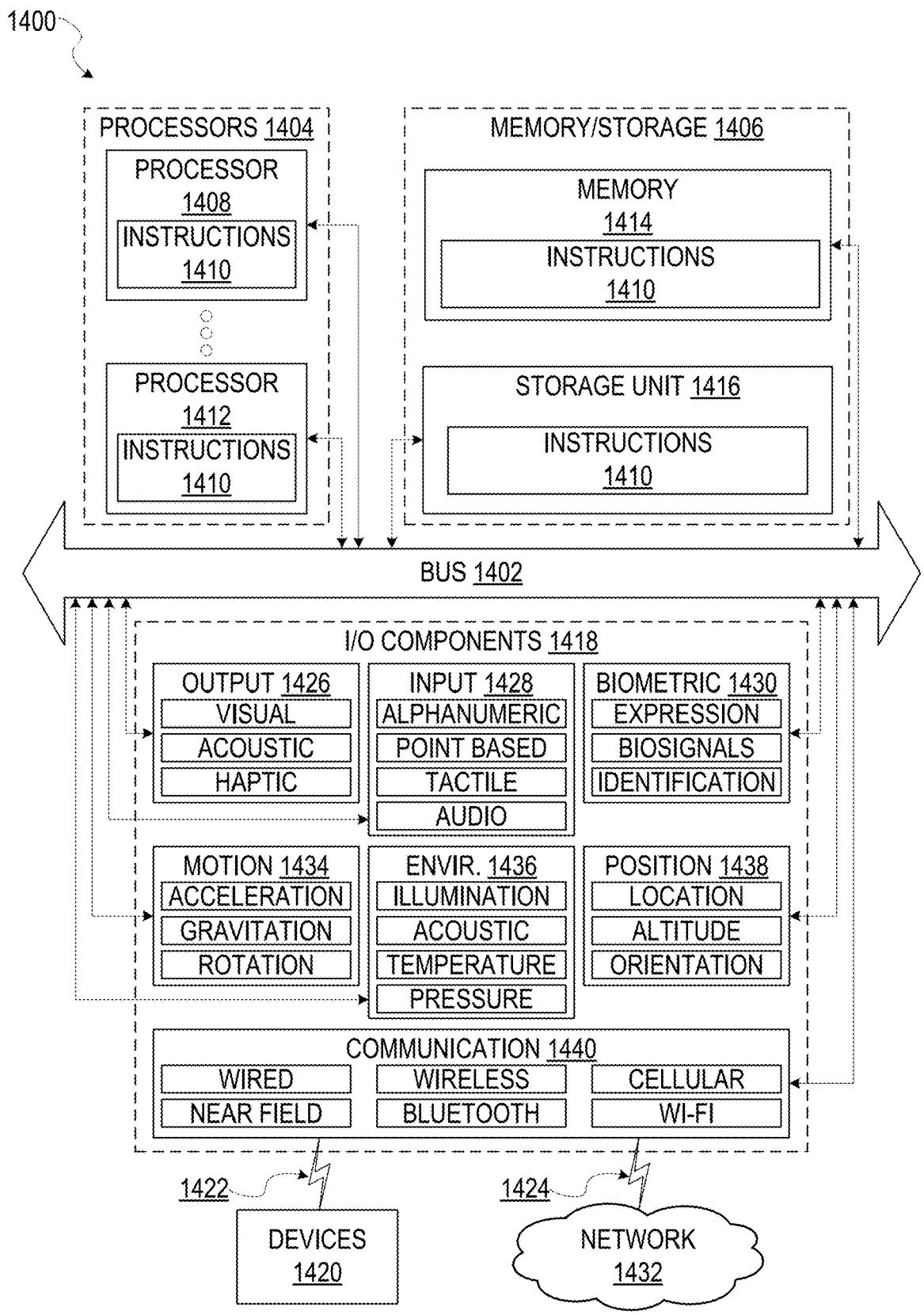
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions 1304 from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1400 capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environmental components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1424 and coupling 1422, respectively. For example, the communication components 1440 may include a network interface component or other suitable device to interface with the network 1432. In further examples, communication components 1440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1410 for execution by the machine 1400, and includes digital or analog communications signals or other intangible medium to facilitate communication of such instructions 1410. Instructions 1410 may be transmitted or received over the network 1432 using a transmission medium via a network interface device and using any one of a number of well-known transfer protocols.

"CLIENT DEVICE" in this context refers to any machine 1400 that interfaces to a communications network 1432 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1432.

"COMMUNICATIONS NETWORK" in this context refers to one or more portions of a network 1432 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1432 or a portion of a network 1432 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1410 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1410. The term "machine-readable medium" shall also be taken to include any medium, or combination of multiple media, that is capable of storing instructions 1410 (e.g., code) for execution by a machine 1400, such that the instructions 1410, when executed by one or more processors 1404 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1404) may be configured by software (e.g., an application 1316 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1404 or other programmable processor 1404. Once configured by such software, hardware components become specific machines 1400 (or specific components of a machine 1400) uniquely tailored to perform the configured functions and are no longer general-purpose processors 1404. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1404 configured by software to become a special-purpose processor, the general-purpose processor 1404 may be configured as respectively different special-purpose processors (e.g., comprising different hardware components) at different times. Software accordingly configures a particular processor or processors 1404, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1402) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1404 that are temporarily configured (e.g., by software) or permanently configured to perform the relevant operations. Whether temporarily or permanently configured, such processors 1404 may constitute processor-implemented components that operate to perform one or more operations or functions described herein. As used herein, "processor-implemented component" refers to a hardware component implemented using one or more processors 1404. Similarly, the methods described herein may be at least partially processor-implemented, with a particular processor or processors 1404 being an example of hardware. For example, at least some of the operations of a method may be performed by one or more processors 1404 or processor-implemented components. Moreover, the one or more processors 1404 may also operate to support performance of the relevant operations in a "cloud computing" environment or as a "software as a service" (SaaS). For example, at least some of the operations may be performed by a group of computers (as examples of machines 1400 including processors 1404), with these operations being accessible via a network 1432 (e.g., the Internet) and via one or more appropriate interfaces (e.g., an API). The performance of certain of the operations may be distributed among the processors 1404, not only residing within a single machine 1400, but deployed across a number of machines 1400. In some example embodiments, the processors 1404 or processor-implemented components may be located in a single geographic location (e.g., within a home environment, an office environment, or a server farm). In other example embodiments, the processors 1404 or processor-implemented components may be distributed across a number of geographic locations.

"PROCESSOR" in this context refers to any circuit or virtual circuit (a physical circuit emulated by logic executing on an actual processor 1404) that manipulates data values according to control signals (e.g., "commands," "op codes," "machine code," etc.) and which produces corresponding output signals that are applied to operate a machine 1400. A processor 1404 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1404 may further be a multi-core processor having two or more independent processors 1404 (sometimes referred to as "cores") that may execute instructions 1410 contemporaneously.

What is claimed is:

1. A method comprising:
receiving, by a hardware processor, a request to add a first prospective user of an online service to an authenticated group;
initiating, by the hardware processor, an approval process to add the first prospective user to the authenticated group, the approval process enabling members of the authenticated group to either approve or deny the request;
receiving, by the hardware processor, a set of responses from the members of the authenticated group, the set of responses indicating whether each member selected to approve or deny the request;
determining, by the hardware processor, an approval score based on the set of responses;
in response to determining that the approval score meets or exceeds a threshold approval score, transmitting, by the hardware processor, an invite message to the first prospective user, the invite message enabling the first prospective user to join the authenticated group;
receiving, by the hardware processor, a subsequent request to add a second prospective user of the online service to the authenticated group;
in response to receiving the subsequent request, initiating, by the hardware processor, a second approval process to add the second prospective user to the authenticated group, the second approval process enabling the members of the authenticated group to either approve or deny the subsequent request;
receiving, by the hardware processor, a second set of responses from the members of the authenticated group, the second set of responses indicating whether each member selected to approve or deny the subsequent request;
determining, by the hardware processor, a second approval score based on the second set of responses; and
in response to determining that the second approval score is less than the threshold approval score, denying, by the hardware processor, the subsequent request to add the second prospective user to the authenticated group.

2. The method of claim 1, wherein determining the approval score comprises:
determining, from the set of responses, a number of responses to approve the request; and
determining the approval score based on the number of responses to approve the request.

3. The method of claim 1, wherein determining the approval score comprises:
assigning a weight to each individual response from the set of responses based on profile data associated with a corresponding member of the authenticated group that provided the individual response, yielding a set of weighted responses; and
determining the approval score based on the set of weighted responses.

4. The method of claim 1, further comprising:
determining, from profile data associated with the first prospective user whether the first prospective user satisfies a rule of eligibility to join the authenticated group; and
initiating the approval process in response to determining that the first prospective user satisfies the rule of eligibility.

5. The method of claim 1, wherein the invite message comprises a provisional invite that enables the first prospective user to join the authenticated group for a provisional period defined by a set of criteria.

6. The method of claim 1, wherein initiating the approval process comprises:
closing the authenticated group to further invites until the approval process has been completed.

7. The method of claim 1, further comprising:
determining a number of invites that have been submitted during a predetermined time period; and
in response to determining that the number of invites meets or exceeds a threshold number invites, denying the subsequent request to add the second prospective user to the authenticated group.

8. The method of claim 1, further comprising:
presenting, to a first member of the authenticated group, a recommendation of at least one prospective user to add to the authenticated group, the at least one prospective user having been selected based on profile data of the first member of the authenticated group, the recommendation enabling the first member to submit requests to add prospective users to the authenticated group.

9. The method of claim 1, further comprising:
identifying a subset of members of the authenticated group based on similarities in profile data of the subset of members; and
transmitting a recommendation to the subset of member to form a separate authenticated group.

10. A system comprising:
one or more computer processors; and
one or more computer-readable mediums storing instructions that, when executed by the one or more computer processors, cause the system to perform operations comprising:
receiving a request to add a first prospective user of an online service to an authenticated group;
initiating an approval process to add the first prospective user to the authenticated group, the approval process enabling members of the authenticated group to either approve or deny the request;
receiving a set of responses from the members of the authenticated group, the set of responses indicating whether each member selected to approve or deny the request;
determining an approval score based on the set of responses;
in response to determining that the approval score meets or exceeds a threshold approval score, transmitting an invite message to the first prospective user, the invite message enabling the first prospective user to join the authenticated group;
receiving a subsequent request to add a second prospective user of the online service to the authenticated group;
in response to receiving the subsequent request, initiating a second approval process to add the second prospective user to the authenticated group, the second approval process enabling the members of the authenticated group to either approve or deny the subsequent request;
receiving a second set of responses from the members of the authenticated group, the second set of responses indicating whether each member selected to approve or deny the subsequent request;
determining a second approval score based on the second set of responses; and in response to determining that the second approval score is less than the threshold approval score, denying the subsequent request to add the second prospective user to the authenticated group.

11. The system of claim 10, wherein determining the approval score comprises:
determining, from the set of responses, a number of responses to approve the request; and
determining the approval score based on the number of responses to approve the request.

12. The system of claim 10, wherein determining the approval score comprises:
assigning a weight to each individual response from the set of responses based on profile data associated with a corresponding member of the authenticated group that provided the individual response, yielding a set of weighted responses; and
determining the approval score based on the set of weighted responses.

13. The system of claim 10, the operations further comprising:
determining, from profile data associated with the first prospective user whether the first prospective user satisfies a rule of eligibility to join the authenticated group; and
initiating the approval process in response to determining that the first prospective user satisfies the rule of eligibility.

14. The system of claim 10, wherein the invite message comprises a provisional invite that enables the first prospective user to join the authenticated group for a provisional period defined by a set of criteria.

15. The system of claim 10, wherein initiating the approval process comprises:
closing the authenticated group to further invites until the approval process has been completed.

16. The system of claim 10, the operations further comprising:
determining a number of invites that have been submitted during a predetermined time period; and
in response to determining that the number of invites meets or exceeds a threshold number invites, denying the subsequent request to add the second prospective user to the authenticated group.

17. The system of claim 10, the operations further comprising:
presenting, to a first member of the authenticated group, a recommendation of at least one prospective user to add to the authenticated group, the at least one prospective user having been selected based on profile data of the first member of the authenticated group, the recommendation enabling the first member to submit requests to add prospective users to the authenticated group.

18. A non-transitory computer-readable medium storing instructions that, when executed by one or more computer processors of one or more computing devices, cause the one or more computing devices to perform operations comprising:
receiving a request to add a first prospective user of an online service to an authenticated group;
initiating an approval process to add the first prospective user to the authenticated group, the approval process enabling members of the authenticated group to either approve or deny the request;
receiving a set of responses from the members of the authenticated group, the set of responses indicating whether each member selected to approve or deny the request;
determining an approval score based on the set of responses;
in response to determining that the approval score meets or exceeds a threshold approval score, transmitting an invite message to the first prospective user, the invite message enabling the first prospective user to join the authenticated group;
receiving a subsequent request to add a second prospective user of the online service to the authenticated group;
in response to receiving the subsequent request, initiating a second approval process to add the second prospective user to the authenticated group, the second approval process enabling the members of the authenticated group to either approve or deny the subsequent request;
receiving a second set of responses from the members of the authenticated group, the second set of responses indicating whether each member selected to approve or deny the subsequent request;
determining a second approval score based on the second set of responses; and
in response to determining that the second approval score is less than the threshold approval score, denying the subsequent request to add the second prospective user to the authenticated group.

19. The non-transitory computer-readable medium of claim 18, wherein determining the approval score comprises:
determining, from the set of responses, a number of responses to approve the request; and
determining the approval score based on the number of responses to approve the request.

20. The non-transitory computer-readable medium of claim 18, wherein determining the approval score comprises:
assigning a weight to each individual response from the set of responses based on profile data associated with a corresponding member of the authenticated group that provided the individual response, yielding a set of weighted responses; and
determining the approval score based on the set of weighted responses.

* * * * *